United States Patent
Lee et al.

(10) Patent No.: US 11,991,115 B2
(45) Date of Patent: May 21, 2024

(54) TERMINAL APPARATUS, BASE STATION APPARATUS, AND COMMUNICATION METHOD

(71) Applicant: SHARP KABUSHIKI KAISHA, Sakai (JP)

(72) Inventors: Taewoo Lee, Sakai (JP); Wataru Ouchi, Sakai (JP); Toshizo Nogami, Sakai (JP); Shoichi Suzuki, Sakai (JP); Tomoki Yoshimura, Sakai (JP); Huifa Lin, Sakai (JP); Daiichiro Nakashima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 25 days.

(21) Appl. No.: 17/764,756

(22) PCT Filed: Sep. 29, 2020

(86) PCT No.: PCT/JP2020/036793
§ 371 (c)(1),
(2) Date: Mar. 29, 2022

(87) PCT Pub. No.: WO2021/065857
PCT Pub. Date: Apr. 8, 2021

(65) Prior Publication Data
US 2022/0360407 A1    Nov. 10, 2022

(30) Foreign Application Priority Data
Oct. 3, 2019  (JP) .................. 2019-183238

(51) Int. Cl.
*H04L 27/26*   (2006.01)
*H04L 5/00*    (2006.01)
*H04W 72/0453* (2023.01)

(52) U.S. Cl.
CPC .......... *H04L 5/0053* (2013.01); *H04L 5/0092* (2013.01); *H04W 72/0453* (2013.01)

(58) Field of Classification Search
CPC ..... H04L 5/0053; H04L 27/26; H04L 5/0091; H04W 72/0453
See application file for complete search history.

(56) References Cited

U.S. PATENT DOCUMENTS

2007/0036065 A1*  2/2007  Wang .................... H04L 5/0091
                                                           370/206
2007/0081484 A1*  4/2007  Wang ................ H03M 13/2771
                                                           370/315

(Continued)

FOREIGN PATENT DOCUMENTS

WO   WO-2019139411 A1 *  7/2019  ........... H04L 1/1812
WO   WO-2020033734 A1 *  2/2020  ............... H04L 5/00

OTHER PUBLICATIONS

3GPP TSG RAN WG2#101, R2-1803747 Title: LS for measurment gap timing offset granularity (Year: 2018).*

(Continued)

*Primary Examiner* — Faruk Hamza
*Assistant Examiner* — Abusayeed M Haque
(74) *Attorney, Agent, or Firm* — ScienBiziP, P.C.

(57) ABSTRACT

A terminal apparatus includes a processing circuitry configured to determine one or multiple first indexes of one or multiple physical resource blocks (PRBs) to which a physical uplink control channel (PUCCH) is mapped, and a transmitting circuitry configured to transmit the PUCCH in a bandwidth part (BWP). In a case that the PUCCH is transmitted using an interlace, the one or multiple first indexes are determined based on a resource block (RB) used for the interlace, the number of interlaces, and the number of the one or multiple PRBs from zero to a starting PRB of the BWP in a common resource block (CRB) index.

5 Claims, 9 Drawing Sheets

(56) References Cited

U.S. PATENT DOCUMENTS

| | | | | |
|---|---|---|---|---|
| 2007/0082696 A1* | 4/2007 | Wang | ............... | H03M 13/2771 |
| | | | | 455/550.1 |
| 2015/0181589 A1* | 6/2015 | Luo | ............... | H04L 5/001 |
| | | | | 370/329 |
| 2019/0274162 A1* | 9/2019 | Zhang | ............... | H04W 74/0808 |
| 2019/0357092 A1* | 11/2019 | Jung | ............... | H04W 36/0055 |
| 2020/0028740 A1* | 1/2020 | Kim | ............... | H04L 41/0895 |

OTHER PUBLICATIONS

"3rd Generation Partnership Project; Technical Specification Group Radio Access Network; NR; Physical channels and modulation(Release 15)", 3GPP TS 38.211 V15.6.0 (Jun. 2019).

"3rd Generation Partnership Project; Technical Specification Group Radio Access Network; NR; Multiplexing and channel coding(Release 15)", 3GPP TS 38.212 V15.6.0 (Jun. 2019).

"3rd Generation Partnership Project; Technical Specification Group Radio Access Network; NR; Physical layer procedures for control(Release 15)", 3GPP TS 38.213 V15.6.0 (Jun. 2019).

"3rd Generation Partnership Project; Technical Specification Group Radio Access Network; NR; Physical layer procedures for data(Release 15)", 3GPP TS 38.214 V15.6.0 (Jun. 2019).

NEC, "Discussion on UL Signals and Channels in NR-U", R1-1902683, 3GPP TSG RAN WG1 #96, Athens, Greece, Feb. 25-Mar. 1, 2019.

LG Electronics, "Physical layer design of UL signals and channels for NR unlicensed operation", R1-1812559, 3GPP TSG RAN WG1 Meeting #95, Nov. 12-16, 2018.

LG Electronics, "Physical layer design of UL signals and channels for NR-U", R1-1900605, 3GPP TSG RAN WG1 Ad-Hoc Meeting 1901, Taipei, Taiwan, Jan. 21-25, 2019.

* cited by examiner

<The number of interlaces and PRBs per single interlace by bandwidth and SCS>

| SCS | 15 kHz | | | 30 kHz | | | | 60 kHz | | | |
|---|---|---|---|---|---|---|---|---|---|---|---|
| $N_{BW}$, Bandwidth | 20 MHz | 40 MHz | 60 MHz | 80 MHz | 20 MHz | 40 MHz | 60 MHz | 80 MHz | 20 MHz | 40 MHz | 60 MHz | 80 MHz |
| $N_{TOTAL}$, Number of total PRBs | 106 | 216 | N/A | N/A | 51 | 106 | 162 | 217 | 24 | 51 | 79 | 107 |
| $N_{INT}$, Number of interlace | 10 | 10 | N/A | N/A | 5 | 5 | 5 | 5 | 2 | 2 | 2 | 2 |
| $M_{PRB}$, Number of PRBs per interlace | 10 or 11 | 21 or 22 | N/A | N/A | 10 or 11 | 21 or 22 | 32 or 33 | 43 or 44 | 12 | 25 or 26 | 39 or 40 | 53 or 54 |

FIG. 7

```
900 — PUCCH-Resource-r16 ::=        SEQUENCE {
901 — pucch-ResourceId              PUCCH-ResourceId,
902 — startingPRB                   PRB-Id,
903 — intraSlotFrequencyHopping     ENUMERATED { enabled }          OPTIONAL,  -- Need R
904 — secondHopPRB                  PRB-Id                          OPTIONAL,  -- Need R
905 — interlaceIndex                INTEGER (0..MaxInterlaceMinus1),
906 — subbandIndication             SubbandIndication,
907 — format                        CHOICE {
            format0                     PUCCH-format0,
            format1                     PUCCH-format1,
            format2                     PUCCH-format2,
            format3                     PUCCH-format3,
            format4                     PUCCH-format4
        }
    }
```

FIG. 9

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority to JP 2019-183238 filed on Oct. 3, 2019, the contents of which are incorporated herein by reference.

BACKGROUND ART

A radio access method and a radio network for cellular mobile communications (hereinafter, referred to as "Long Term Evolution (LTE: registered trademark)," or "Evolved Universal Terrestrial Radio Access (EUTRA)") have been studied in the 3rd Generation Partnership Project (3GPP). In 3GPP, a new radio access method (hereinafter referred to as "New Radio (NR)") is being studied (NPLs 1, 2, 3, 4). In LTE, a base station apparatus is also referred to as an evolved NodeB (eNodeB). In NR, a base station apparatus is also referred to as a gNodeB. In LTE, and in NR, a terminal apparatus is also referred to as a User Equipment (UE). LTE, as well as NR, is a cellular communication system in which multiple areas are deployed in a cellular structure, with each of the multiple areas being covered by a base station apparatus. A single base station apparatus may manage multiple cells.

In NR, a set of downlink BWP (bandwidth part) and uplink BWP is configured for one serving cell (NPL 3). The terminal apparatus receives PDSCH and PDSCH in the downlink BWP.

CITATION LIST

Non Patent Literature

NPL 1: "3GPP TS 38.211 V15.6.0 (2019-06), NR; Physical channels and modulation".
NPL 2: "3GPP TS 38.212 V15.6.0 (2019-06), NR; Multiplexing and channel coding".
NPL 3: "3GPP TS 38.213 V15.6.0 (2019-06), NR; Physical layer procedures for control".
NPL 4: "3GPP TS 38.214 V15.6.0 (2019-06), NR; Physical layer procedures for data".

SUMMARY OF INVENTION

Technical Problem

One aspect of the present invention provides a terminal apparatus that can efficiently perform reception of uplink transmission and/or downlink transmission, a communication method used for the terminal apparatus, a base station apparatus that can efficiently perform reception of downlink transmission and/or uplink transmission, and a communication method used for the base station apparatus.

Solution to Problem (1) A first aspect of the present invention is a terminal apparatus including: a processing circuitry configured to determine one or multiple first indexes of one or multiple physical resource blocks (PRBs) to which a physical uplink control channel (PUCCH) is mapped; and a transmitting circuitry configured to transmit the PUCCH in a bandwidth part (BWP), wherein in a case that the PUCCH is transmitted using an interlace, the one or multiple first indexes are determined based on a resource block (RB) used for the interlace, the number of interlaces, and the number of the one or multiple PRBs from zero to a starting PRB of the BWP in a common resource block (CRB) index.

(2) A second aspect of the present invention is a base station apparatus including a receiving circuitry configured to receive a physical uplink control channel (PUCCH) in a bandwidth part (BWP) by using one or multiple first indexes of one or multiple physical resource blocks (PRBs) to which the PUCCH is mapped, wherein in a case that the PUCCH is transmitted using an interlace, the one or multiple first indexes are determined based on a resource block (RB) used for the interlace, the number of interlaces, and the number of the one or multiple PRBs from zero to a starting PRB of the BWP in a common resource block (CRB) index.

(3) A third aspect of the present invention is a communication method used for a terminal apparatus, the communication method comprising the steps of: determining one or multiple first indexes of one or multiple physical resource blocks (PRBs) to which a physical uplink control channel (PUCCH) is mapped; and transmitting the PUCCH in a bandwidth part (BWP), wherein in a case that the PUCCH is transmitted using an interlace, the one or multiple first indexes are determined based on a resource block (RB) used for the interlace, the number of interlaces, and the number of the one or multiple PRBs from zero to a starting PRB of the BWP in a common resource block (CRB) index.

(4) A fourth aspect of the present invention is a communication method used for a base station apparatus, the communication method comprising the step of receiving a physical uplink control channel (PUCCH) in a bandwidth part (BWP) by using one or multiple first indexes of one or multiple physical resource blocks (PRBs) to which the PUCCH is mapped, wherein in a case that the PUCCH is transmitted using an interlace, the one or multiple first indexes are determined based on a resource block (RB) used for the interlace, the number of the interlaces, and the number of the one or multiple PRBs from zero to a starting PRB of the MVP in a common resource block (CRB) index.

Advantageous Effects of Invention

According to one aspect of the present invention, the terminal apparatus can efficiently perform uplink transmission. The base station apparatus can efficiently perform reception of uplink transmission.

BRIEF DESCRIPTION OF DRAWINGS

FIG. 7 is a diagram illustrating an example of a relationship between a bandwidth, a subcarrier spacing (SCS), the number of interlaces, and the number of PRBs included in one interlace according to the present embodiment.

FIG. 9 is an example illustrating a configuration of a higher layer parameter PUCCH resource according to the present embodiment.

DESCRIPTION OF EMBODIMENTS

An embodiment of the present invention will be described below.

Figure 1:
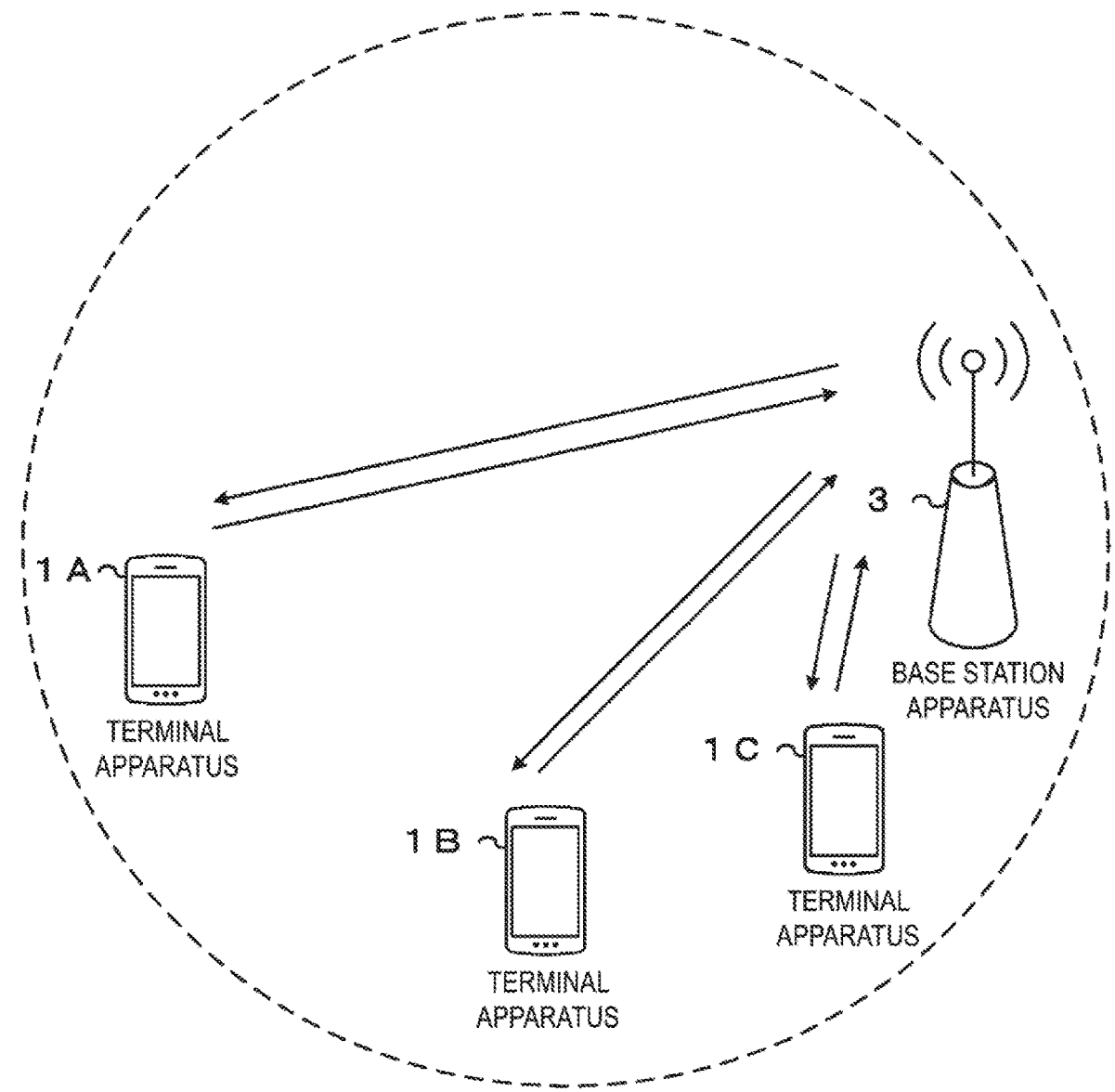
FIG. 1 is a conceptual diagram of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. The terminal apparatuses 1A to 1C are each referred to as a terminal apparatus 1.

Physical channels and physical signals according to the present embodiment will be described.

In uplink radio communication from the terminal apparatus 1 to the base station apparatus 3, the following uplink physical channels are used. The uplink physical channels are used to transmit information output from a higher layer.

Physical Uplink Control Channel (PUCCH)
Physical Uplink Shared Channel (PUSCH)
Physical Random Access Channel (PRACH)

The PUCCH is used by the terminal apparatus 1 to transmit Uplink Control Information (UCI) to the base station apparatus 3. Note that, in the present embodiment, the terminal apparatus 1 may perform transmission of the PUCCH in a primary cell, and/or a secondary cell having a function of the primary cell, and/or a secondary cell in which the PUCCH can be transmitted. In other words, the PUCCH may be transmitted in a specific serving cell.

The uplink control information includes at least one of: downlink Channel State Information (CSI); a Scheduling Request (SR) indicating a request for a PUSCH resource; and a Hybrid Automatic Repeat Request ACKnowledgement (HARQ-ACK) for downlink data (a Transport block, a Medium Access Control Protocol Data Unit (MAC PDU), a Downlink-Shared Channel (DL-SCH), or a Physical Downlink Shared Channel (PDSCH)).

The HARQ-ACK is also referred to as an ACK/NACK, HARQ feedback, HARQ-ACK feedback, a HARQ response, a HARQ-ACK response, HARQ information, HARQ-ACK information, HARQ control information, and HARQ-ACK control information. In a case that downlink data is successfully decoded, an ACK for the downlink data is generated. In a case that downlink data is not successfully decoded, a NACK for the downlink data is generated. Discontinuous transmission (DTX) may mean that the downlink data has not been detected. The discontinuous transmission (DTX) may mean that data for which a HARQ-ACK response is to be transmitted has not been detected. The HARQ-ACK may include at least an HARQ-ACK bit corresponding at least to one transport block. The HARQ-ACK bit may indicate an acknowledgement (ACK) or a negative-acknowledgement (NACK) corresponding to one or multiple transport blocks. The HARQ-ACK may include at least an HARQ-ACK codebook including one or multiple HARQ-ACK bits. The fact that the HARQ-ACK bit corresponds to one or multiple transport blocks may mean that the HARQ-ACK bit corresponds to a PDSCH including the one or the multiple transport blocks.

The HARQ-ACK bit may indicate an ACK or NACK corresponding to one Code Block Group (CBG) included in the transport block. The HARQ-ACK is also referred to as HARQ feedback, HARQ information, or HARQ control information.

The channel state information (CSI) may include a channel quality indicator (CQI) and a rank indicator (RI). The channel quality indicator may include a Precoder Matrix Indicator (PMI) and a CSI-RS indicator (CRI). The channel state information may include a precoder matrix indicator. The CQI is an indicator associated with channel quality (propagation strength), and the PMI is an indicator indicating a precoder. The RI is an indicator indicating a transmission rank (or the number of transmission layers). The CSI is also referred to as a CSI report or CSI information.

The CSI report may be divided into one or multiple. For example, in a case that the CSI report is divided into two, the first CSI report resulting from the division may be CSI-part 1, and the second CSI report resulting from the division may be CSI-part 2. The size of the CSI report may be a part or all of the bits of CSI resulting from the division. The size of the CSI report may be the number of bits of the CSI-part 1. The size of the CSI report may be the number of bits of the CSI-part 2. The size of the CSI report may be the sum of the numbers of bits of multiple CSI reports resulting from the division. The sum of the numbers of bits of multiple pieces of CSI resulting from the division is the number of bits of the CSI report before being divided. The CSI-part 1 may include at least a part or all of any one of the RI, the CRI, the CQI, and the PMI. The CSI-part 2 may include a part or all of any one of the PMI, the CQI, the RI, and the CRI.

The Scheduling Request (SR) may be used at least for requesting a resource of a PUSCH for initial transmission. The scheduling request bit may be used for indicating one of a positive SR or a negative SR. The scheduling request bit indicating the positive SR is also referred to as "the positive SR being transmitted". The positive SR may indicate that resources of the PUSCH for initial transmission are requested by the terminal apparatus 1. The positive SR may indicate that a scheduling request is triggered by a higher layer. The positive SR may be transmitted in a case that the higher layer indicates transmission of the scheduling request. The scheduling request bit indicating the negative SR is also referred to as "the negative SR being transmitted". The negative SR may indicate that resources of the PUSCH for initial transmission are not requested by the terminal apparatus 1. The negative SR may indicate that the scheduling request is not triggered by the higher layer. The negative SR may be transmitted in a case that transmission of a scheduling request is not indicated by the higher layer.

The scheduling request bits may be used for indicating either of the positive SR or the negative SR for any one of one or multiple SR configurations. Each of the one or multiple SR configurations may correspond to one or multiple logical channels. The positive SR for a certain SR configuration may be a positive SR for any one or all of the one or multiple logical channels corresponding to the certain SR configuration. The negative SR need not correspond to a specific SR configuration. The fact that the negative SR is indicated may mean that the negative SR is indicated for all of the SR configurations.

The SR configuration may be a Scheduling Request ID.

The PUSCH may be used for transmitting uplink data (a Transport block, a Medium Access Control Protocol Data Unit (MAC PDU), an Uplink Shared Channel (UL-SCH)). The PUSCH may be used to transmit a HARQ-ACK and/or channel state information along with the uplink data. Furthermore, the PUSCH may be used to transmit only the channel state information or to transmit only the HARQ-ACK and the channel state information. In other words, the PUSCH may be used for transmitting the uplink control information. The terminal apparatus 1 may transmit the PUSCH, based on detection of a Physical Downlink Control Channel (PDCCH) including an uplink grant.

The PRACH may be used to transmit a random access preamble (random access message 1). The PRACH may be used to indicate at least some of an initial connection establishment procedure, a handover procedure, a connection re-establishment procedure, synchronization (timing adjustment) for transmission of uplink data, and a request for a PUSCH (UL-SCH) resource.

In uplink radio communication from the terminal apparatus 1 to the base station apparatus 3, the following uplink physical signals may be used. The uplink physical signals need not be used for transmitting information output from a higher layer, but are used by a physical layer.

Uplink Reference Signal (UL RS)

According to the present embodiment, at least the following two types of uplink reference signal may be at least used.

Demodulation Reference Signal (DMRS)

Sounding Reference Signal (SRS)

The DMRS is associated with transmission of a PUSCH and/or a PUCCH. The DMRS may be multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. The DMRS may correspond to the PUSCH. Transmission of both of the PUCCH and the DMRS is hereinafter referred to simply as transmission of the PUCCH. The DMRS may correspond to the PUCCH.

The SRS may not be associated with transmission of the PUSCH and/or the PUCCH. An SRS may be associated with transmission of the PUSCH and/or the PUCCH. The base station apparatus 3 may use the SRS for measurement of a channel state. The SRS may be transmitted in one or a certain number of multiple OFDM symbols from the last in an uplink slot.

The following downlink physical channels may be used for downlink radio communication from the base station apparatus 3 to the terminal apparatuses 1. The downlink physical channels may be used by the physical layer to transmit information output from the higher layer.

Physical Broadcast Channel (PBCH)

Physical Downlink Control Channel (PDCCH)

Physical Downlink Shared Channel (PDSCH)

The PBCH is used for broadcasting a Master Information Block (MIB) that is used in common in one or multiple terminal apparatuses 1 in a serving cell, in an active Bandwidth Part (BWP), or in a carrier. The PBCH may be transmitted based on a prescribed transmission interval. For example, the PBCH may be transmitted at an interval of 80 ms. At least some of information included in the PBCH may be updated every 80 ms. The PBCH may include a prescribed number of subcarriers (for example, 288 subcarriers) in the frequency domain. The PBCH may include 2, 3, or 4 OFDM symbols in the time domain. The MIB may include information associated with an identifier (index) of a synchronization signal. The MIB may include information indicating at least some of a slot number, a subframe number, and a radio frame number in which the PBCH is transmitted. First configuration information may be included in the MIB. The first configuration information may be configuration information used at least in some or all of a random access message 2, a random access message 3, and a random access message 4.

The PDCCH is used to transmit downlink control information (DCI). The downlink control information is also referred to as DCI format. Note that the DCI format may also include one or multiple downlink control information fields. The downlink control information may at least include one of an uplink grant and a downlink grant.

The uplink grant may be used for scheduling of a single PUSCH in a single cell. The uplink grant may be used for scheduling multiple PUSCHs in multiple slots in a single cell. The uplink grant may be used for scheduling a single PUSCH in multiple slots in a single cell. The downlink control information including the uplink grant may also be referred to as a DCI format related to the uplink.

A single downlink grant is at least used for scheduling of a single PDSCH in a single serving cell. The downlink grant is at least used for the scheduling of the PDSCH in the same slot as the slot in which the downlink grant is transmitted. The downlink control information including the downlink grant may also be referred to as a DCI format related to the downlink.

The PDSCH is used to transmit downlink data (TB, MAC PDU, DL-SCH, PDSCH, CB, and CBG). The PDSCH is at least used to transmit a random access message 2 (random access response). The PDSCH is used at least for transmitting System information including a parameter that is used for initial access.

The BCH, UL-SCH, and DL-SCH described above are transport channels. A channel used in a Medium Access Control (MAC) layer is referred to as a transport channel. A unit of the transport channel used in the MAC layer is also referred to as a transport block or a MAC PDU. Control of the Hybrid Automatic Repeat reQuest (HARQ) is performed for each transport block in the MAC layer. The transport block is a unit of data that the MAC layer delivers to the physical layer. In the physical layer, the transport block is mapped to a codeword, and modulation processing is performed for each codeword.

The base station apparatus 3 and the terminal apparatus 1 may exchange (transmit and/or receive) signals in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. The base station apparatus 3 and the terminal apparatus 1 may transmit and/or receive an MAC Control Element (CE) in the MAC layer. Here, the RRC signaling and/or the MAC CE is also referred to as a higher layer signaling.

The PUSCH and the PDSCH are at least used to transmit the RRC signaling and the MAC CE. Here, the RRC signaling transmitted from the base station apparatus 3 on the PDSCH may be RRC signaling common to multiple terminal apparatuses 1 in a cell. The RRC signaling common to the multiple terminal apparatuses 1 in the cell is also referred to as common RRC signaling. The RRC signaling transmitted from the base station apparatus 3 on the PDSCH may be RRC signaling dedicated to a certain terminal apparatus 1 (which is also referred to as dedicated signaling or UE specific signaling). The RRC signaling dedicated to the terminal apparatus 1 is also referred to as dedicated RRC signaling. A cell specific parameter may be transmitted using the RRC signaling common to the multiple terminal apparatuses 1 in the cell or the RRC signaling dedicated to the certain terminal apparatus 1. A UE specific parameter may be transmitted using the RRC signaling dedicated to the certain terminal apparatus 1.

A configuration of the radio frame according to the present embodiment will be described below.

Figure 2:
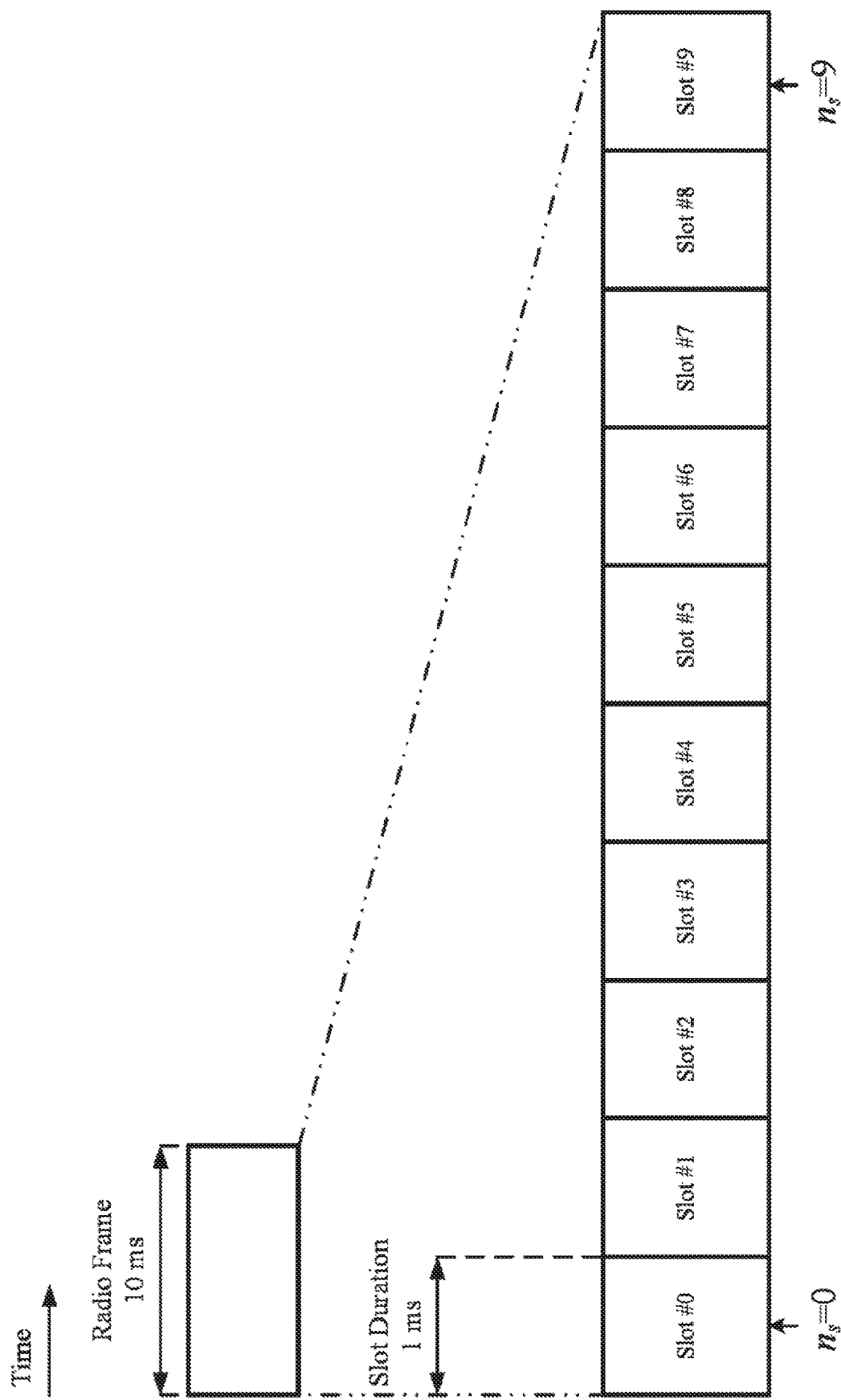
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. Each of the radio frames may be 10 ms in length. Furthermore, each of the radio frames may include ten slots. Each of the slots may be 1 ms in length.

Figure 3:
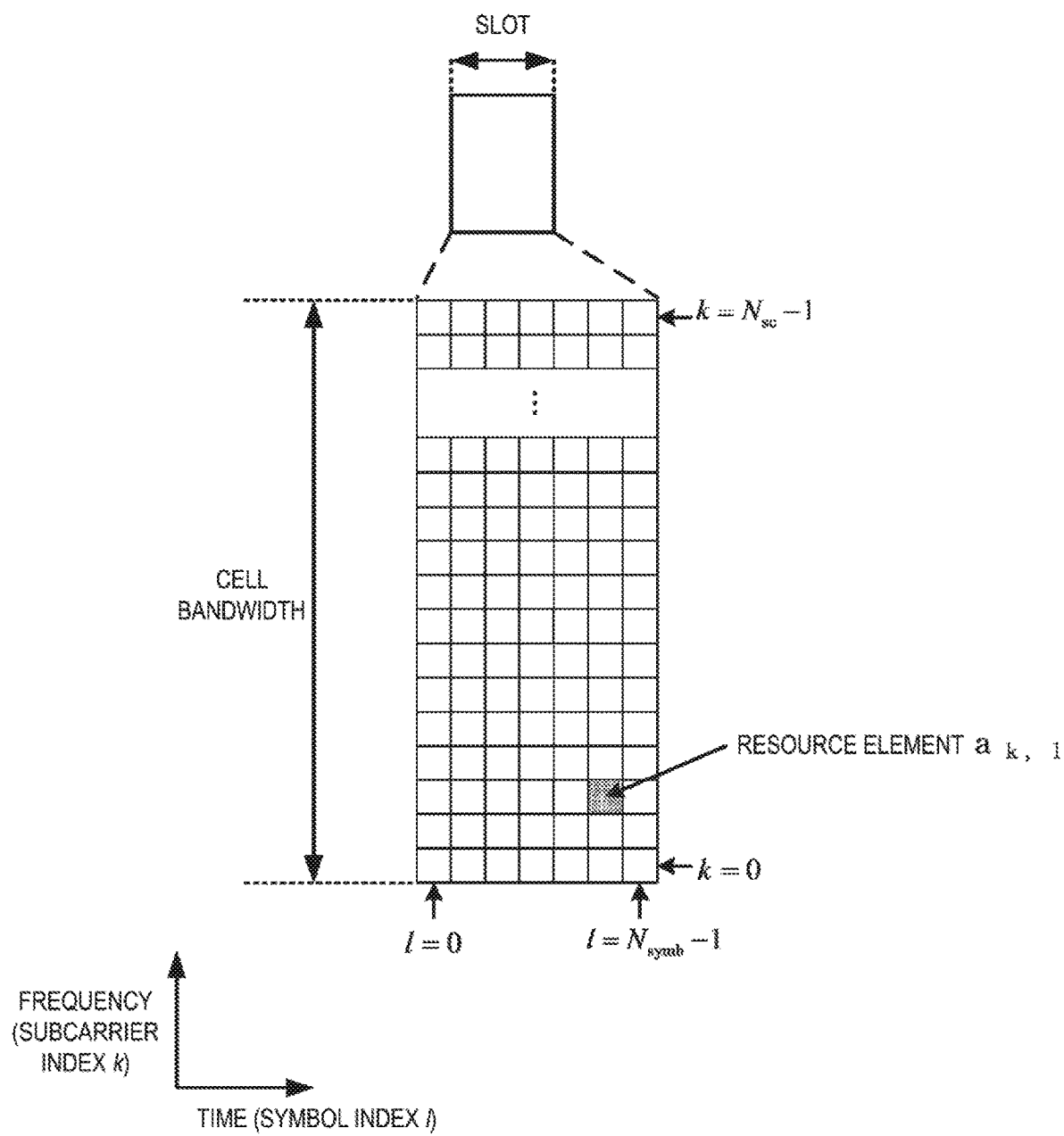
FIG. 3 is a diagram illustrating a schematic configuration of an uplink slot according to the present embodiment.

An example configuration of a slot according to the present embodiment will be described below. FIG. 3 is a diagram illustrating a schematic configuration of the uplink slot according to the present embodiment. FIG. 3 illustrates a configuration of the uplink slot in a cell. In FIG. 3, the horizontal axis is a time axis, and the vertical axis is a frequency axis. The uplink slot may include $N^{UL}_{symb}$ SC-FDMA symbols. The uplink slot may include $N^{UL}_{symb}$ OFDM symbols. In the following, in the present embodiment, description will be given using a case in which the uplink slot includes OFDM symbols. However, the present embodiment can also be applied to a case in which the uplink slot includes SC-FDMA symbols.

In FIG. 3, l is an OFDM symbol number/index, and k is a subcarrier number/index. The physical signal or the physical channel transmitted in each of the slots is represented by a resource grid. In the uplink, the resource grid is defined by multiple subcarriers and multiple OFDM symbols. Each element in the resource grid is referred to as a resource element. The resource element is represented by a subcarrier number/index k and an OFDM symbol number/index l.

In the time domain, the uplink slot may include multiple OFDM symbols l (l=0, 1, . . . , $N^{UL}_{symb}-1$). In one uplink slot, for a normal Cyclic Prefix (normal CP) in the uplink, $N^{UL}_{symb}$ may be 7 or 14. For an extended Cyclic Prefix (extended CP) in the uplink, $N^{UL}_{symb}$ may be 6 or 12.

The terminal apparatus 1 receives a higher layer parameter UL-CyclicPrefixLength indicating a CP length in the uplink from the base station apparatus 3. The base station apparatus 3 may broadcast system information including the higher layer parameter UL-CyclicPrefixLength corresponding to a cell, in the cell.

In the frequency domain, the uplink slot may include multiple subcarriers k (k=0, 1, . . . , $N^{UL}_{RB} \cdot N^{RB}_{SC}-1$). $N^{UL}_{RB}$ is an uplink bandwidth configuration for the serving cell, and is expressed by a multiple of $N^{RB}_{SC}$. $N^{RB}_{SC}$ is a (physical) resource block size in the frequency domain represented by the number of subcarriers. The subcarrier spacing Δf may be 15 kHz. The $N^{RB}_{SC}$ may be 12. The (physical) resource block size in the frequency domain may be 180 kHz.

In the radio communication system according to an aspect of the present embodiment, Orthogonal Frequency Division Multiplex (OFDM) is at least used. An OFDM symbol is a unit of OFDM in the time domain. The OFDM symbol at least includes one or multiple subcarriers. The OFDM symbol may be converted into a time-continuous signal in baseband signal generation.

A SubCarrier Spacing (SCS) may be provided by a subcarrier spacing Δf=2μ·15 kHz. For example, a subcarrier spacing configuration μ may be configured to be any of 0, 1, 2, 3, 4, and/or 5. For a certain BandWidth Part (BWP), the subcarrier spacing configuration μ may be provided by a higher layer parameter.

The downlink slot in the present embodiment includes multiple OFDM symbols. The configuration of the downlink slot in the present embodiment is basically the same as that of the uplink, and description of the configuration of the downlink slot is thus omitted.

Configurations of apparatuses according to the present embodiment will be described below.

Figure 4:
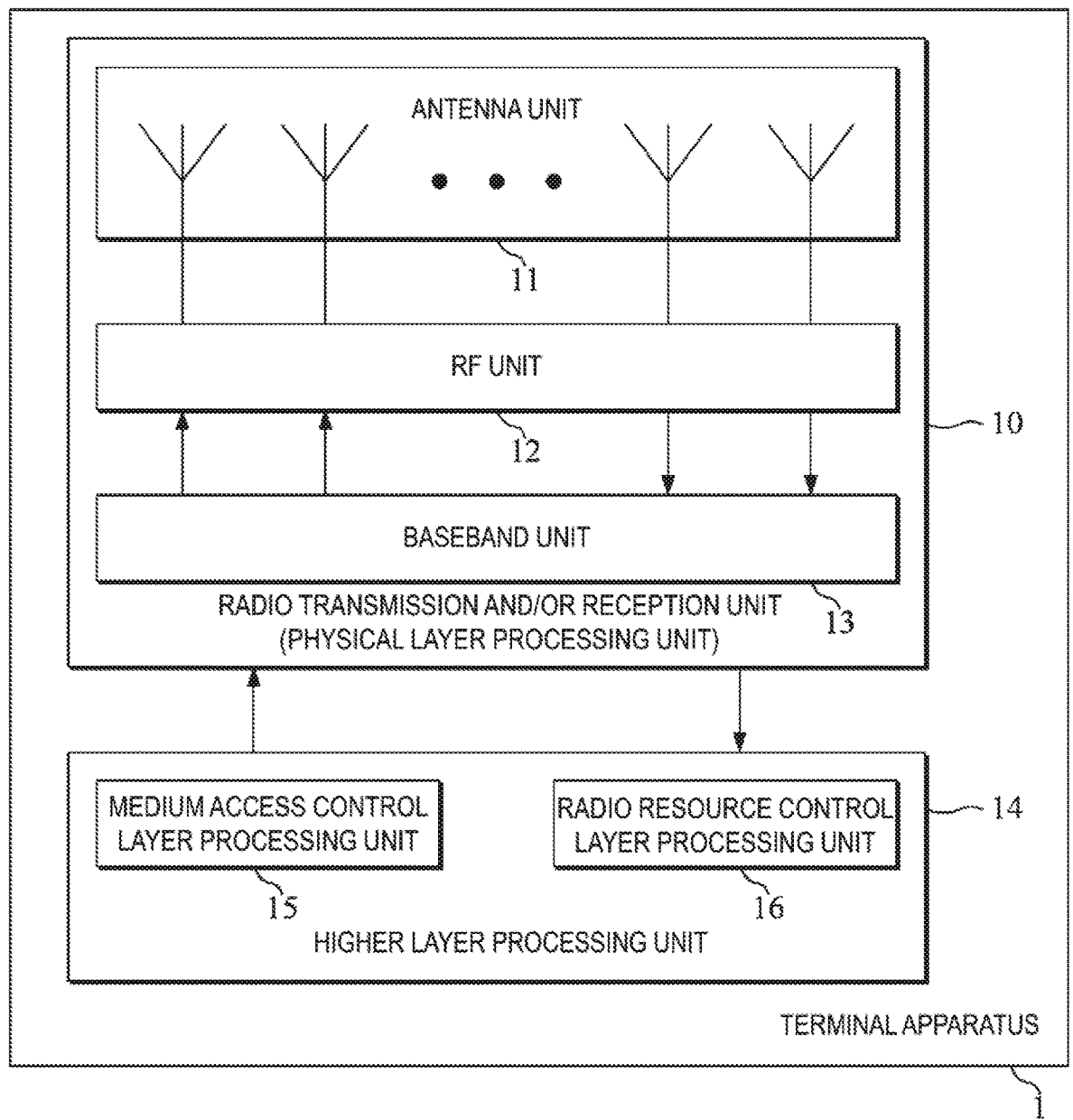
FIG. 4 is a schematic block diagram illustrating a configuration of a terminal apparatus 1 according to the present embodiment.

FIG. 4 is a schematic block diagram illustrating a configuration of the terminal apparatus 1 according to the present embodiment. As illustrated in the figure, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitting circuitry, a receiving circuitry, a coding unit, a decoding unit, or a physical layer processing unit. The transmitting circuitry may transmit a physical signal and/or a physical channel. The physical signal may include an uplink demodulation reference signal and/or a sounding reference signal. The physical channel may include the PRACH, the PUCCH, and/or the PUSCH. The transmitting circuitry may transmit a part or all of the PRACH, the PUCCH, and the PUSCH. The receiving circuitry may receive a physical signal and/or a physical channel. The physical signal may include a downlink demodulation reference signal, a channel state information reference signal, and/or a synchronization signal. The physical channel may include the PBCH, the PDCCH, and/or the PDSCH. The receiving circuitry may receive a part or all of the PBCH, the PDCCH, and/or the PDSCH.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls random access procedure in accordance with various types of configuration information/parameters managed by the radio resource control layer processing unit 16.

The radio resource control layer processing unit 16 included in the higher layer processing unit 14 performs processing of the Radio Resource Control layer. The radio resource control layer processing unit 16 performs management of various pieces of configuration information/parameters of its apparatus. The radio resource control layer processing unit 16 sets various pieces of configuration information/parameters, based on a higher layer signaling received from the base station apparatus 3. Specifically, the radio resource control layer processing unit 16 sets various pieces of configuration information/parameters, based on information indicating the various pieces of configuration information/parameters received from the base station apparatus 3.

The radio transmission and/or reception unit 10 performs processing of the physical layer, such as modulation, demodulation, coding, and decoding. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down converts) a signal received via the antenna unit 11 into a baseband signal by means of orthogonal demodulation, and removes an unnecessary frequency component. The RF unit 12 outputs a processed analog signal to the baseband unit.

The baseband unit 13 converts the analog signal input from the RF unit 12 from the analog signal into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing inverse Fast Fourier Transform (IFFT) of the data, adds CP to the generated SC-FDMA symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 through a low-pass filter, up converts the analog signal into a signal of a carrier frequency, and transmits the up converted signal via the antenna unit 11. The RF unit 12 amplifies power. The RF unit 12 may have a function of controlling transmission power. The RF unit 12 is also referred to as a transmission power control unit.

Figure 5:
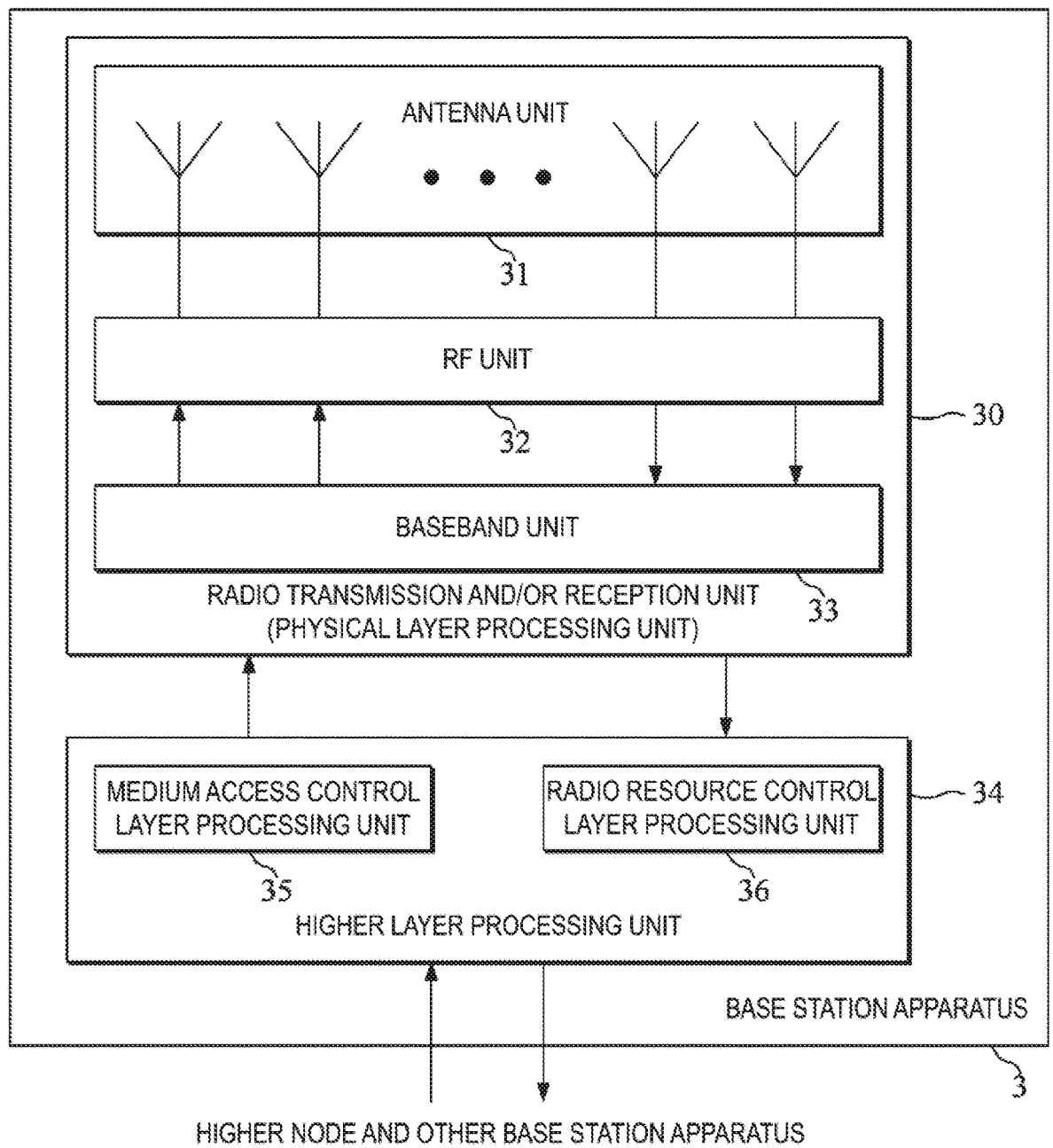
FIG. 5 is a schematic block diagram illustrating a configuration of a base station apparatus 3 according to the present embodiment.

FIG. 5 is a schematic block diagram illustrating a configuration of the base station apparatus 3 according to the present embodiment. As illustrated in the figure, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitting circuitry, a receiving circuitry, a coding unit, a decoding unit, or a physical layer processing unit. The receiving circuitry may receive a physical signal and/or a physical channel. The physical signal may include an uplink demodulation reference signal and/or a sounding reference signal. The physical channel may include the PRACH, the PUCCH, and/or the PUSCH. The transmitting circuitry may receive a part or all of the PRACH, the PUCCH, and the PUSCH. The transmitting circuitry may transmit a physical signal and/or a physical channel. The physical signal may include a downlink demodulation reference signal, a channel state information reference signal, and/or a synchronization signal. The physical channel may include the PBCH, the PDCCH, and/or the PDSCH. The transmitting circuitry may transmit a part or all of the PBCH, the PDCCH, and/or the PDSCH.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 controls random access procedure in accordance with various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. The radio resource control layer processing unit 36 performs management of various pieces of configuration information/parameters of each of the terminal apparatuses 1. The radio resource control layer processing unit 36 may set various pieces of configuration information/parameters for each of the terminal apparatuses 1 through a higher layer signaling. Specifically, the radio resource control layer processing unit 36 transmits or broadcasts information indicating the various pieces of configuration information/parameters.

The functionality of the radio transmission and/or reception unit 30 is similar to the functionality of the radio transmission and/or reception unit 10, and description thereof will thus be omitted.

Each of the units denoted by the reference sign 10 to the reference sign 16 included in the terminal apparatus 1 may be configured as a circuit. Each of the units denoted by the reference sign 30 to the reference sign 36 included in the base station apparatus 3 may be configured as a circuit. Each of the units that are included in the terminal apparatus 1 and have the reference signs 10 to 16 may be configured as at least one processor and a memory coupled to the at least one processor. Each of the units that are included in the base station apparatus 3 and have the reference signs 30 to 36 may be configured as at least one processor and a memory coupled to the at least one processor.

Time Division Duplex (TDD) and/or Frequency Division Duplex (FDD) may be applied to a radio communication system according to the present embodiment. In a case of a cell aggregation, serving cells to which TDD is applied and serving cells to which FDD is applied may be aggregated.

Note that the higher layer signaling may be any one of Remaining Minimum System Information (RMSI), Other System Information (OSI), a System Information Block (SIB), a Radio Resource Control (RRC) message, and a Medium Access Control Control Element (MAC CE). The higher layer parameter (higher layer parameter) may mean a parameter and an information element included in the higher layer signaling. The system information may be SIB1.

The UCI transmitted on the PUCCH may include the HARQ-ACK, the scheduling request, and/or the CSI. The UCI transmitted on the PUCCH may include a combination of any of the HARQ-ACK, the scheduling request, and/or the CSI.

In a certain component carrier, New Radio-Unlicensed (NR-U) may be applied. In a certain serving cell, NR-U may be applied. A fact that NR-U is applied in a certain component carrier (or a certain serving cell) may at least include a technique (framework, configuration) including a part or all of the following element A1 to element A6.

Element A1: In the certain component carrier (or the certain serving cell), the second SS burst set is configured Element A2: The base station apparatus 3 transmits the second SS/PBCH block in the certain component carrier (or the certain serving cell)

Element A3: The terminal apparatus 1 receives the second SS/PBCH block in the certain component carrier (or the certain serving cell)

Element A4: The base station apparatus 3 transmits the PDCCH in the second Type 0 PDCCH common search space set in the certain component carrier (or the certain serving cell)

Element A5: The terminal apparatus 1 receives the PDCCH in the second Type 0 PDCCH common search space set in the certain component carrier (or the certain serving cell)

Element A6: A higher layer parameter (for example, a field included in the MIB) related to NR-U indicates a first value (for example, 1)

In a certain component carrier, New Radio-Unlicensed (NR-U) need not be applied. In a certain serving cell, NR-U need not be applied. A fact that NR-U is not applied in a certain component carrier (or a certain serving cell) may at least include a technique (framework, configuration) including a part or all of the following element B1 to element B6.

Element B1: In the certain component carrier (or the certain serving cell), the first SS burst set is configured Element B2: The base station apparatus 3 transmits the first SS/PBCH block in the certain component carrier (or the certain serving cell)

Element B3: The terminal apparatus 1 receives the first SS/PBCH block in the certain component carrier (or the certain serving cell)

Element B4: The base station apparatus 3 transmits the PDCCH in the first Type 0 PDCCH common search space set in the certain component carrier (or the certain serving cell)

Element B5: The terminal apparatus 1 receives the PDCCH in the first Type 0 PDCCH common search space set in the certain component carrier (or the certain serving cell)

Element B6: A higher layer parameter (for example, a field included in the MIB) related to NR-U indicates a value (for example, 0) different from the first value The certain component carrier may be configured in a licensed band. The certain serving cell may be configured in a licensed band. Here, a fact that the certain component carrier (or the certain serving cell) is configured in a licensed band may at least include a part or all of the following configuration 1 to configuration 3.

Configuration 1: A higher layer parameter indicating operation in a licensed band for the certain component carrier (or the certain serving cell) is given, or a higher layer parameter indicating operation in an unlicensed band for the certain component carrier (or the certain serving cell) is not given Configuration 2: The certain component carrier (or the certain serving cell) is configured so as to operate in a licensed band, or the certain component carrier (or the certain serving cell) is not configured so as to operate in an unlicensed band Configuration 3: The certain component carrier (or the certain serving cell) is included in a licensed band, or the certain component carrier (or the certain serving cell) is not included in an unlicensed band The licensed band may be such a band that the radio station license is required for the terminal apparatus that operates (is expected to operate) in the licensed band. The licensed band may be a band in which only terminal apparatuses manufactured by an operator (business entity, business, organization, company) with radio station license are allowed to operate. The unlicensed band may be such a band that the channel access procedure prior to transmission of the physical signal is not required.

The unlicensed band may be such a band that the radio station license is not required for the terminal apparatus that operates (is expected to operate) in the unlicensed band. The unlicensed band may be such a band in which terminal apparatuses manufactured by a part or all of an operator with the radio station license and/or an operator without the radio station license are allowed to operate. The unlicensed band may be such a band that the channel access procedure prior to transmission of the physical signal is required.

Whether or not NR-U is applied to the certain component carrier (or the certain serving cell) may be determined based on whether or not at least the certain component carrier (or the certain serving cell) is configured for a band that can be operated in the unlicensed band (for example, a band that can be operated only in the unlicensed band). For example, a list of bands designed for NR or carrier aggregation of NR may be defined. For example, in a case that a certain band is included in a band in which one or multiple bands in the list can be operated in the unlicensed band (for example, a band that can be operated only in the unlicensed band), NR-U may be applied to the certain band. In a case that a certain band is not included in a band in which one or multiple bands in the list can be operated in the unlicensed band (for example, a band that can be operated only in the unlicensed band), NR-U need not be applied to the certain band, and normal NR (for example, NR of release 15, or NR other than NR-U of release 16) may be applied.

Whether or not NR-U is applied to the certain component carrier (or the certain serving cell) may be determined based on whether or not at least the component carrier (or the serving cell) is configured for a band in which NR-U can be operated (for example, a band that can be operated only in NR-U). For example, in a case that a certain band is included in a band in which one or multiple bands in the list can be operated in NR-U (for example, a band that can be operated only in NR-U), NR-U may be applied to the certain band. In a case that a certain band is not included in a band in which one or multiple bands in the list can be operated in NR-U (for example, a band that can be operated only in NR-U), NR-U need not be applied to the certain band, and normal NR (for example, NR of release 15, or NR other than NR-U of release 16) may be applied.

Whether or not NR-U is applied to the certain component carrier (or the certain serving cell) may be determined based on the MIB or information included in the system information. For example, in a case that information indicating whether or not NR-U is applied is included in the MIB (or the system information), and the information indicates application of NR-U, NR-U may be applied to the serving cell associated with the MIB (or the system information). In contrast, in a case that the information does not indicate application of NR-U, NR-U need not be applied to the serving cell associated with the MIB (or the system information), and normal NR may be applied thereto. Alternatively, the information may indicate whether or not operation is possible in the unlicensed band.

The certain component carrier may be configured in the unlicensed band. The certain serving cell may be configured in the unlicensed band. Here, a fact that the certain component carrier (or the certain serving cell) is configured in the unlicensed band may at least include a part or all of the following configuration 4 to configuration 6. Configuration 4: A higher layer parameter indicating operation in the unlicensed band is given to the certain component carrier (or the certain serving cell), Configuration 5: The certain component carrier (or the certain serving cell) is configured so as to operate in the unlicensed band, Configuration 6: The certain component carrier (or the certain serving cell) is included in the unlicensed band In the following, description is given on the assumption that the component carrier is configured in the licensed band or is configured in the unlicensed band. Note that "the component carrier is configured in the licensed band" may mean "the serving cell is configured in the licensed band", and "the component carrier is configured in the unlicensed band" may mean "the serving cell is configured in the unlicensed band".

Whether the terminal apparatus 1 receives a first SS/PBCH block or receives a second SS/PBCH block in a certain component carrier may be given based at least on a part or all of whether or not NR-U is applied in the certain component carrier and whether or not the certain component carrier is configured in the unlicensed band.

For example, in a case that the certain component carrier is configured in the licensed band, the terminal apparatus 1 may receive the first SS/PBCH block. In a case that the certain component carrier is configured in the licensed band, the terminal apparatus 1 may receive the first PDCCH in the first type 0 PDCCH common search space set. In a case that the certain component carrier is configured in the licensed band, the base station apparatus 3 may transmit the first SS/PBCH block. In a case that the certain component carrier is configured in the licensed band, the base station apparatus 3 may receive the first PDCCH in the first type 0 PDCCH common search space set.

In a case that the certain component carrier is configured in the unlicensed band, the terminal apparatus 1 may receive the second SS/PBCH block. In a case that the certain component carrier is configured in the unlicensed band, the terminal apparatus 1 may receive the second PDCCH in the second type 0 PDCCH common search space set. In a case that the certain component carrier is configured in the unlicensed band, the base station apparatus 3 may transmit the second SS/PBCH block. In a case that the certain component carrier is configured in the unlicensed band, the base station apparatus 3 may receive the second PDCCH in the second type 0 PDCCH common search space set.

For example, in a case that NR-U is not applied in the certain component carrier, and the component carrier is configured in the licensed band, the terminal apparatus 1 may receive the first SS/PBCH block. In a case that NR-U is not applied in the certain component carrier, and the component carrier is configured in the licensed band, the terminal apparatus 1 may receive the first PDCCH in the first type 0 PDCCH common search space set. In a case that NR-U is not applied in the certain component carrier, and the component carrier is configured in the licensed band, the base station apparatus 3 may transmit the first SS/PBCH block. In a case that NR-U is not applied in the certain component carrier, and the component carrier is configured in the licensed band, the base station apparatus 3 may receive the first PDCCH in the first type 0 PDCCH common search space set.

For example, in a case that NR-U is not applied in the certain component carrier, and the component carrier is configured in the unlicensed band, the terminal apparatus 1 may receive the second SS/PBCH block. In a case that NR-U is not applied in the certain component carrier, and the component carrier is configured in the unlicensed band, the terminal apparatus 1 may receive the first PDCCH in the second type 0 PDCCH common search space set. In a case that NR-U is not applied in the certain component carrier, and the component carrier is configured in the unlicensed band, the base station apparatus 3 may transmit the second SS/PBCH block. In a case that NR-U is not applied in the certain component carrier, and the component carrier is configured in the unlicensed band, the base station apparatus 3 may receive the first PDCCH in the second type 0 PDCCH common search space set.

For example, in a case that NR-U is applied in the certain component carrier, and the component carrier is configured in the licensed band, the terminal apparatus 1 may receive the second SS/PBCH block. In a case that NR-U is applied in the certain component carrier, and the component carrier is configured in the licensed band, the terminal apparatus 1 may receive the first PDCCH in the second type 0 PDCCH common search space set. In a case that NR-U is applied in the certain component carrier, and the component carrier is configured in the licensed band, the base station apparatus 3 may transmit the second. SS/PBCH block. In a case that NR-U is applied in the certain component carrier, and the component carrier is configured in the licensed band, the base station apparatus 3 may receive the first PDCCH in the second type 0 PDCCH common search space set.

For example, in a case that NR-U is applied in the certain component carrier, and the component carrier is configured in the unlicensed band, the terminal apparatus 1 may receive the second SS/PBCH block. In a case that NR-U is applied in the certain component carrier, and the component carrier is configured in the unlicensed band, the terminal apparatus 1 may receive the first PDCCH in the second type 0 PDCCH common search space set. In a case that NR-U is applied in the certain component carrier, and the component carrier is configured in the unlicensed band, the base station apparatus 3 may transmit the second SS/PBCH block. In a case that NR-U is applied in the certain component carrier, and the component carrier is configured in the unlicensed band, the base station apparatus 3 may receive the first PDCCH in the second type 0 PDCCH common search space set.

The terminal apparatus 1 may transmit the PRACH, the PUCCH, or the PUSCH by using one or multiple interlaces. One interlace may mean selection and transmission of a PRB having the same interval in a part or all of PRBs given to the terminal apparatus 1. The same interval may mean that the number of PRBs present between one first PRB of the interlace and one second PRB of the interlace and the number of PRBs present between the one second PRB of the interlace and one third PRB of the interlace are the same. In PUSCH or PUCCH transmission using the interlace in one or multiple certain activated BWPs, the number of interlaces and the number of PRBs included in one interlace may be assigned to the terminal apparatus 1 for the PUSCH or PUCCH transmission. For example, in a case that the number of PRBs assigned to the terminal apparatus 1 is 100 in one or multiple certain activated BWPs, the number of interlaces may be 10, and the number of PRBs included in one interlace may be 10.

The number of interlaces assigned to the terminal apparatus 1 and/or the number of PRBs included in one interlace may be given to the terminal apparatus 1 by the DCI and/or the higher layer parameter.

Figure 6:
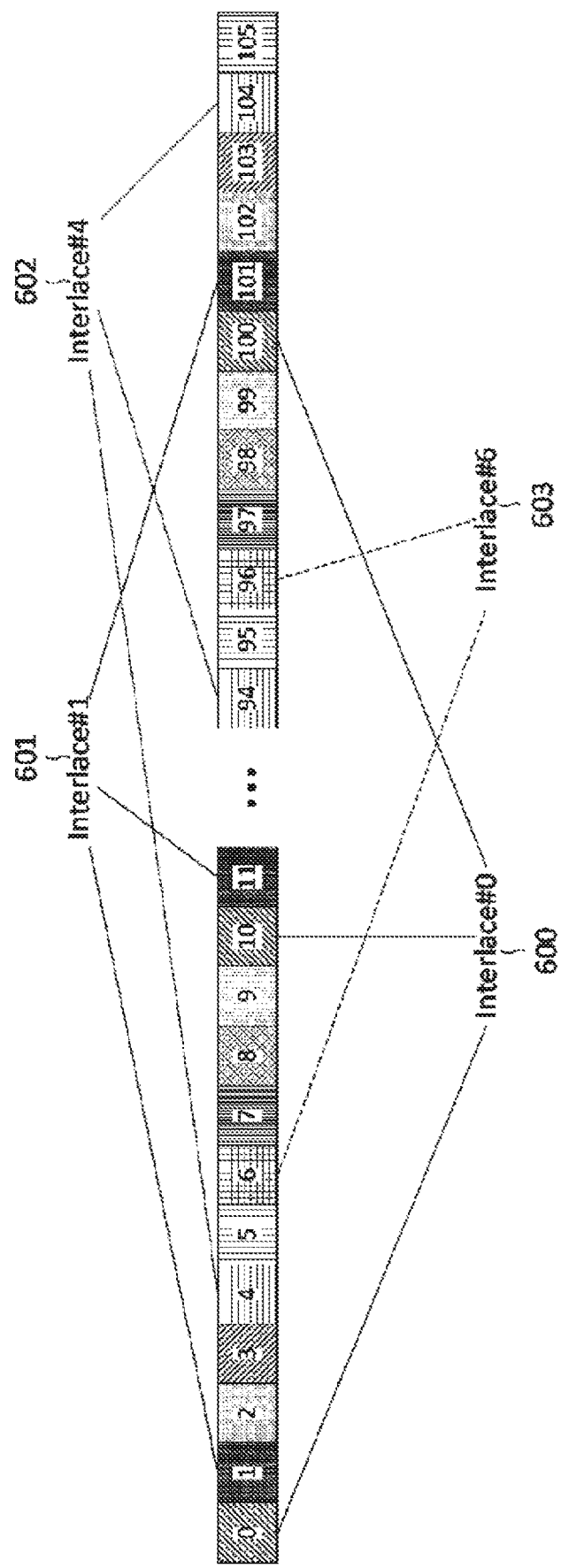
FIG. 6 is a diagram illustrating an example of interlaces according to the present embodiment.

FIG. 6 is a diagram illustrating an example of the interlaces according to the present embodiment. In FIG. 6, the number of PRBs given to the terminal apparatus 1 may be 106. In FIG. 6, in one or multiple certain activated BWPs, a maximum of 10 interlaces from interlace #0 to interlace #9 may be configured. The number of PRBs constituting one interlace may be 10 or 11. For example, 600 being interlace #0 may include 11 PRBs, and 603 being interlace #6 may include 10 PRBs.

FIG. 7 is a diagram illustrating an example of a relationship between the bandwidth, the subcarrier spacing (SCS), the number of interlaces, and the number of PRBs included in one interlace according to the present embodiment. The row of 700 may indicate the subcarrier spacing. The row of 701 may indicate the bandwidth. The row of 702 may be the number of all of the PRBs corresponding to the subcarrier spacing of the row of 700 and the bandwidth of the row of 701. The number of interlaces may be constant regardless of the bandwidth in a certain SCS.

The index of the interlace may be associated with a PRB index ($n_{PRB}$). The index of the interlace may be associated with a common resource block (CRB) index. The CRB index ($n_{CRB}$) may be the sum of the PRB index and $N_{BWP}^{start}$. For example, the relationship of $n_{CRB}=n_{PRB}+N_{BWP}^{start}$ may hold. Here, $N_{BWP}^{start}$ may be the number of PRBs from CRB index 0 to the starting PRB of the MVP. The number of PRBs may be the number excluding the starting PRB of the BWP. The index of the interlace may satisfy the relationship of ($n_{PRB}$ mod $N_{int}$). The index of the interlace may be (($n_{PRB}+N_{BWP}^{start}$) mod $N_{int}$). Here, $N_{int}$ may be the number of interlaces for each SCS. In a case of 30 kHz SCS, $N_{int}$ may be 5. In a case of 15 kHz SCS, $N_{int}$ may be 10.

The terminal apparatus 1 may configure a PUCCH resource(s) used for PUCCH transmission in a PUCCH format, based on one or multiple higher layer parameters. For example, in a case that a higher layer parameter PUCCH-Format0 is included in a higher layer parameter format, one or multiple PUCCH resources used for PUCCH transmission may include PUCCH format 0. In a case that a higher layer parameter PUCCH-Format1 is included in a higher layer parameter format, one or multiple PUCCH resources used for PUCCH transmission may include PUCCH format 1. In a case that a higher layer parameter PUCCH-Format2 is included in a higher layer parameter format, one or multiple PUCCH resources used for PUCCH transmission may include PUCCH format 2. In a case that a higher layer parameter PUCCH-Format3 is included in a higher layer parameter format, one or multiple PUCCH resources used for PUCCH transmission may include PUCCH format 3. In a case that a higher layer parameter PUCCH-Format4 is included in a higher layer parameter format, one or multiple PUCCH resources used for PUCCH transmission may include PUCCH format 4. In a case that a higher layer parameter PUCCH-Format0A is included in a higher layer parameter format, one or multiple PUCCH resources used for PUCCH transmission may include PUCCH format 0A. In a case that a higher layer parameter PUCCH-Format1A is included in a higher layer parameter format, one or multiple PUCCH resources used for PUCCH transmission may include PUCCH format 1A. In a case that a higher layer parameter PUCCH-Format2 is included in a higher layer parameter format, one or multiple PUCCH resources used for PUCCH transmission may include PUCCH format 2A. In a case that a higher layer parameter PUCCH-Format3 is included in a higher layer parameter format, one or multiple PUCCH resources used for PUCCH transmission may include PUCCH format 3A.

Here, the PUCCH format may be defined based at least on a value and a type of the higher layer parameter used for configuration of the PUCCH resources corresponding to the PUCCH format and/or the number of UCI bits that can be transmitted in the PUCCH resources corresponding to the PUCCH format. For example, PUCCH format 0 and/or PUCCH format 0A may have a length of one or two OFDM symbols, and the number of UCI bits may be 1 or 2 bits. PUCCH format 1 and/or PUCCH format 1A may have a length of four OFDM symbols or more, and the number of UCI bits may be 1 or 2 bits. PUCCH format 2 and/or PUCCH format 2A may have a length of one or two OFDM symbols, and the number of UCI bits may be equal to or greater than 3. PUCCH format 3 and/or PUCCH format 3A may have a length of equal to or longer than four OFDM symbols, and the number of UCI bits may be equal to or greater than 3. PUCCH format 4 may have a length of equal to or longer than four OFDM symbols, and the number of UCI bits may be equal to or greater than 3. The PUCCH resources configured in PUCCH format 4 may include an OCC. In a case that the number of UCI bits is 2 bits or less in PUCCH format 2A or PUCCH format 3A, with the use of redundancy data (for example, zero padding, padding, a repetition code, coding, or the like), the terminal apparatus 1 may perform processing so that the sum of the number of UCI bits and the number of bits of the redundancy data is equal to or greater than 3 bits.

A PUCCH resource set may be configured to one or multiple by a higher layer parameter PUCCH-resource-set. A maximum number of PUCCH resources included in one PUCCH resource set may be configured by a higher layer parameter maxNrofPUCCH-ResourcePerSet. The terminal apparatus 1 may determine the PUCCH resource set according to the number A of bits of the UCI. In a case that the number A of bits of the UCI is equal to or smaller than $N_1$, the terminal apparatus 1 may determine the first PUCCH resource set. In a case that the number A of bits of the UCI is greater than $N_1$ and is equal to or smaller than $N_2$, the terminal apparatus 1 may determine the second PUCCH resource set. In a case that the number A of bits of the UCI is equal to or greater than $N_2$ and is equal to or smaller than $N_3$, the terminal apparatus 1 may determine the third PUCCH resource set. In a case that the number A of bits of the UCI is equal to or greater than $N_3$ and is equal to or smaller than $N_4$, the terminal apparatus 1 determines the fourth PUCCH resource set. $N_1$ may be 2. $N_4$ may be 1706. $N_2$ and $N_3$ may be configured with a higher layer parameter.

In a case that the terminal apparatus 1 is not configured with the higher layer parameter PUCCH-resource-set for configuring the PUCCH resource set, an uplink BWP for PUCCH transmission with HARQ-ACK information may be indicated by SystemInformationBlockType1, and the PUCCH resource set may be indicated by a higher layer parameter PUCCH-resource-common included in SystemInformationBlockType1.

In order that the terminal apparatus 1 transmits the HARQ-ACK information by using the PUCCH, the terminal apparatus 1 determines the PUCCH resource after determining the PUCCH resource set. Determination of the PUCCH resource may be performed based at least on a value of a PUCCH resource indicator (PRI) field included in last DCI format 1_0 or DCI format 1_1 detected by the terminal apparatus 1.

The terminal apparatus 1 may transmit, on the PUCCH, the HARQ-ACK information corresponding to order indicated by detected DCI format 1_0 or DCI format 1_1. With ascending order being used for the order of detected DCI format 1_0 or DCI format 1_1, the indexes between cells are first configured and then PDCCH monitoring occasions. For example, in a case that the terminal apparatus 1 detects DCI format A in a PDCCH monitoring occasion T and DCI format B in a PDCCH monitoring occasion (T+1) in a serving cell 1 and detects DCI format C in a PDCCH monitoring occasion T and DCI format D in a PDCCH monitoring occasion (T+1) in a serving cell 2, the terminal apparatus 1 may transmit, on the PUCCH, the HARQ-ACK information corresponding to each of the DCI formats in order of DCI format A, DCI format C, DCI format B, and DCI format D. Here, DCI format A, DCI format B, DCI format C, and DCI format D may each be any DCI format of at least DCI format 1_0 and DCI format 1_1.

The terminal apparatus 1 may determine the PUCCH resource configured by PUCCH-ResourceId included in a higher layer parameter resourceList, which is indicated by a value of a PUCCH resource indicator field included in DCI format 1_0 or DCI format 1_1 detected from the PDCCH. For example, in a case that one or multiple PUCCH resources having four PUCCH-ResourceIds in the higher layer parameter resourceList are included in a certain PUCCH resource set, in a case that a PUCCH resource corresponding to value 00 of the PUCCH resource indicator field is configured with a first PUCCH resource, a PUCCH resource corresponding to value 01 of the PUCCH resource indicator field is configured with a second PUCCH resource, a PUCCH resource corresponding to value 10 of the PUCCH resource indicator field is configured with a third PUCCH resource, and a PUCCH resource corresponding to value 11 of the PUCCH resource indicator field is configured with a fourth PUCCH resource in the one or multiple PUCCH resource, and in a case that the value of the PUCCH resource indicator field included in DCI format 1_0 or DCI format 1_1 detected from the PDCCH by the terminal apparatus 1 is 10, the terminal apparatus 1 may select the third PUCCH resource.

Each of the PUCCH resources may be given based at least on a part or all of a starting symbol index to which the PUCCH is mapped, the number of symbols (symbol duration), a starting PRB index of the first hop (starting PRB index of first hop) of a case that frequency hopping is not performed or of a case that frequency hopping is performed, a starting PRB index of the second hop (starting PRB index of second hop) of a case that frequency hopping is performed, the number of PRBs, a Frequency hopping flag, an index of an initial cyclic shift, an index of the OCC, and an implementation indication of intra-slot frequency hopping. Regarding one or multiple PUCCH resources configured for one PUCCH resource set, small indexes may be given to the PUCCH resources each having a small number of PRBs. In other words, PUCCH resource 1 may have a smaller number of PRBs than or an equal number of PRBs to that of PUCCH resource 2. Here, the PRB is also referred to as a bandwidth or an RB.

In a case that the higher layer parameter format indicates PUCCH-format0 in a certain PUCCH resource, the PUCCH format configured for the PUCCH resource may be PUCCH format 0. The PUCCH format 0 may at least include a part or all of the initial cyclic shift given by a higher layer parameter initialCyclicShift, the number of symbols for PUCCH transmission given by a higher layer parameter nrofSymbols, and the first symbol index for PUCCH transmission given by a higher layer parameter startingSymbolIndex.

A cyclic shift α of the certain PUCCH resource may be given based at least on the initial cyclic shift of the certain PUCCH resource. The cyclic shift α of the certain PUCCH resource may be given based at least on addition (or subtraction) of a prescribed value to (or from) a value of the initial cyclic shift of the certain PUCCH resource. The cyclic shift α of the certain PUCCH resource may be equal to the initial cyclic shift of the certain PUCCH resource.

In a case that the higher layer parameter format indicates PUCCH-format1 in a certain PUCCH resource, the PUCCH format configured for the PUCCH resource may be PUCCH format 1. The PUCCH format 1 may at least include a part or all of the initial cyclic shift given by a higher layer parameter initialCyclicShift, the number of symbols for PUCCH transmission given by a higher layer parameter nrofSymbols, the first symbol index for PUCCH transmission given by a higher layer parameter startingSymbolIndex, and the index of the orthogonal cover code (OCC) given by a higher layer parameter timeDomainOCC.

In a case that the higher layer parameter format indicates PUCCH-format2 in a certain PUCCH resource, the PUCCH format configured for the PUCCH resource may be PUCCH format 2. The PUCCH format 2 may at least include a part or all of the number of PRBs given by a higher layer parameter nrofPRBs, the number of symbols for PUCCH transmission given by a higher layer parameter nrofSymbols, and the first symbol index for PUCCH transmission given by a higher layer parameter startingSymbolIndex.

In a case that the higher layer parameter format indicates PUCCH-format3 in a certain PUCCH resource, the PUCCH format configured for the PUCCH resource may be PUCCH format 3. The PUCCH format 3 may at least include a part or all of the number of PRBs given by a higher layer parameter nrofPRBs, the number of symbols for PUCCH transmission given by a higher layer parameter nrofSymbols, and the first symbol index for PUCCH transmission given by a higher layer parameter startingSymbolIndex.

In a case that the higher layer parameter format indicates PUCCH-format4 in a certain PUCCH resource, the PUCCH format configured for the PUCCH resource may be PUCCH format 4. The PUCCH format 4 may at least include a part or all of the number of symbols for PUCCH transmission given by a higher layer parameter nrofSymbols, the length of the orthogonal cover code given by a higher layer parameter occ-Length, the index of the orthogonal cover code given by a higher layer parameter occ-Index, and the first symbol index for PUCCH transmission given by a higher layer parameter startingSymbolIndex.

In a case that the higher layer parameter format indicates PUCCH-format0A in a certain PUCCH resource, the PUCCH format configured for the PUCCH resource may be PUCCH format 0A. The PUCCH format 0A may at least include a part or all of the initial cyclic shift given by a higher layer parameter initialCyclicShift, the number of symbols for PUCCH transmission given by a higher layer parameter nrofSymbols, the first symbol index for PUCCH transmission given by a higher layer parameter startingSymbolIndex, and the index of the interlace.

In a case that the higher layer parameter format indicates PUCCH-format1A in a certain PUCCH resource, the PUCCH format configured for the PUCCH resource may be PUCCH format 1A. The PUCCH format 1A may at least include a part or all of the initial cyclic shift given by a higher layer parameter initialCyclicShift, the number of symbols for PUCCH transmission given by a higher layer parameter nrofSymbols, the first symbol index for PUCCH transmission given by a higher layer parameter startingSymbolIndex, the index of the orthogonal cover code (OCC) given by a higher layer parameter timeDomainOCC, and the index of the interlace.

In a case that the higher layer parameter format indicates PUCCH-format2A in a certain PUCCH resource, the PUCCH format configured for the PUCCH resource may be PUCCH format 2A. The PUCCH format 2A may at least include a part or all of the number of PRBs given by a higher layer parameter nrofPRBs, the number of symbols for PUCCH transmission given by a higher layer parameter nrofSymbols, the first symbol index for PUCCH transmission given by a higher layer parameter startingSymbolIndex, the index of a time domain orthogonal cover code (OCC) given by a higher layer parameter timeDomainOCC, the length of the time domain orthogonal cover code given by a higher layer parameter timeDomainocc-Length, the index of a frequency domain orthogonal cover code given by a higher layer parameter occ-Index, the length of the frequency domain orthogonal cover code given by a higher layer parameter freqDomainocc-Length, and the index of the interlace.

In a case that the higher layer parameter format indicates PUCCH-format3A in a certain PUCCH resource, the PUCCH format configured for the PUCCH resource may be PUCCH format 3A. The PUCCH format 3A may at least include a part or all of the number of PRBs given by a higher layer parameter nrofPRBs, the number of symbols for PUCCH transmission given by a higher layer parameter nrofSymbols, the first symbol index for PUCCH transmission given by a higher layer parameter startingSymbolIndex, the index of a time domain orthogonal cover code (OCC) given by a higher layer parameter timeDomainOCC, the length of the time domain orthogonal cover code given by a higher layer parameter timeDomainocc-Length, the index of a frequency domain orthogonal cover code given by a higher layer parameter occ-Index, the length of the frequency domain orthogonal cover code given by a higher layer parameter freqDomainocc-Length, and the index of the interlace.

In a case that the terminal apparatus 1 does not have a PUCCH resource configuration given by PUCCH-ResourceSet included in a higher layer parameter PUCCH-Config, one or multiple PUCCH resource sets for transmission of the UCI including the HARQ-ACK information may be given based on pucch-ResourceCommon included in SystemInformationBlockType1 (SIB1). The pucch-ResourceCommon may be an index corresponding to a row number or a column number of a table including one or multiple PUCCH resource sets. The terminal apparatus 1 may select one PUCCH resource set from the table including the one or multiple PUCCH resource sets, based on a value of the pucch-ResourceCommon.

In a case that the terminal apparatus 1 does not have a PUCCH resource configuration given by PUCCH-ResourceSet included in a higher layer parameter PUCCH-Config, one or multiple PUCCH resource sets for transmission of the UCI including the HARQ-ACK information may be given based at least on a part or all of a PUCCH resource set index, the PUCCH format, the first symbol index used for PUCCH transmission, the number of symbols used for PUCCH transmission, the index of the frequency domain orthogonal cover code, the index of the time domain orthogonal cover code, and an offset of the index of the interlace.

In a case that the terminal apparatus 1 does not have a PUCCH resource configuration given by PUCCH-ResourceSet included in a higher layer parameter PUCCH-Config, the terminal apparatus 1 may select the PUCCH resource for transmission of the UCI including the HARQ-ACK information, based at least on a table including one or multiple PUCCH resource sets and a configuration of the PUCCH resource set(s).

In a case that the terminal apparatus 1 does not have a PUCCH resource configuration given by PUCCH-ResourceSet included in a higher layer parameter PUCCH-Config, and the terminal apparatus 1 transmits the HARQ-ACK information for the PDSCH scheduled by DCI format 1_0 or DCI format 1_1 by using the PUCCH, the terminal apparatus 1 may determine a PUCCH resource index $r_{PUCCH}$, based at least on a part or all of a total number $N_{CCE}$ of CCEs included in the CORESET in which the PDCCH including DCI format 1_0 or DCI format 1_1 is received, a first CCE index $n_{CCE,0}$ for reception of the PDCCH in the CORESET, and a value $\Delta_{PRI}$ of the PUCCH resource indicator field included in DCI format 1_0 or DCI format 1_1.

In a case that the terminal apparatus 1 does not have a PUCCH resource configuration given by PUCCH-ResourceSet included in a higher layer parameter PUCCH-Config, and the terminal apparatus 1 transmits the HARQ-ACK information for the PDSCH scheduled by DCI format 1_0 or DCI format 1_1 by using the PUCCH, the terminal apparatus 1 may determine a PUCCH resource index $r_{PUCCH}$, based at least on a part or all of a total number $N_{CCE}$ of CCEs included in the CORESET in which the PDCCH including DCI format 1_0 or DCI format 1_1 is received, a first CCE index $n_{CCE,0}$ for reception of the PDCCH in the CORESET, and a value $\Delta_{PRI}$ of the PUCCH resource indicator field included in DCI format 1_0 or DCI format 1_1.

In a case that floor($r_{PUCCH}/8$) is 0, the terminal apparatus 1 may determine the PRB index for PUCCH transmission in the first hop of frequency hopping, based at least on $RB_{BWP}^{offset}$+floor($r_{PUCCH}/N_{CS}$). In a case that floor($r_{PUCCH}/8$) is 0, the terminal apparatus 1 may determine the PRB index for PUCCH transmission in the second hop of frequency hopping, based at least on $N_{BWP}^{size}-1-RB_{BWP}^{offset}-$floor($r_{PUCCH}/N_{CS}$). In a case that floor($r_{PUCCH}/8$) is 0, the terminal apparatus 1 may determine one Initial Cyclic Shift index from a set of initial cyclic shift indexes, based on $r_{PUCCH}$ mod $N_{CS}$. $N_{CS}$ may be a total number of elements of the set of initial cyclic shift indexes in each row of the column of 906. For example, in the row of index 0 of the column of 901, $N_{CS}$ may be 2. $N_{BWP}^{size}$ may be the number of PRBs of an initial uplink BWP for transmitting the PUCCH. $RB_{BWP}^{offset}$ may be a value of the column of 905. For example, in the row of index 6 of the column of 901, $RB_{BWP}^{offset}$ may be 4. Here, mod (or modulo operation) is a function that outputs a remainder in a case that A is divided by B, and is expressed by (A mod B). For example, (5 mod 4)=1 may hold. Floor (or floor operation) is a function that outputs an integer obtained by rounding down digits after the decimal point of a numerical value. For example, in a case that F=3.9, floor(F)=3, and in a case that F=5.2, floor(F)=5.

In a case that floor($r_{PUCCH}/8$) is 1, the terminal apparatus 1 may determine the PRB index for PUCCH transmission in the first hop of frequency hopping, based at least on $N_{BWP}^{size}-1-RB_{BWP}^{offset}-$floor(($r_{PUCCH}-8$)/$N_{CS}$). In a case that floor($r_{PUCCH}/8$) is 1, the terminal apparatus 1 may determine the PRB index for PUCCH transmission in the second hop of frequency hopping, based at least on $RB_{BWP}^{offset}+$floor(($r_{PUCCH}-8$)/$N_{CS}$). In a case that floor ($r_{PUCCH}/8$) is 0, the terminal apparatus 1 may determine one Initial Cyclic Shift index from a set of initial cyclic shift indexes, based on ($r_{PUCCH}-8$) mod $N_{CS}$.

In a case that the terminal apparatus 1 does not have a PUCCH resource configuration given by PUCCH-ResourceSet included in a higher layer parameter PUCCH-Config, one or multiple PUCCH resource sets for transmission of the UCI including the HARQ-ACK information may be given based at least on a part or all of a PUCCH resource set index, the PUCCH format, the first symbol index used for PUCCH transmission, the number of symbols used for PUCCH transmission, a PRB offset, and the index of the initial cyclic shift.

FIG. 9 is an example illustrating a configuration of a higher layer parameter PUCCH resource according to the present embodiment. A higher layer parameter PUCCH-Resource-r16 of 900 may include higher layer parameters 901, 902, 903, 904, 905, 906, and 907. A higher layer parameter pucch-ResourceId 901 may include an ID of the PUCCH resource configured for the terminal apparatus 1. A higher layer parameter startingPRB 902 may be a PRB index of the starting PRB to which the terminal apparatus 1 maps the PUCCH. In other words, a higher layer parameter startingPRB 902 may be the smallest PRB index out of one or multiple PRBs to which the terminal apparatus 1 maps the PUCCH. A higher layer parameter intraSlotFrequencyHopping 903 may be a parameter for determining whether or not frequency hopping is performed. A higher layer parameter secondHopPRB may be a PRB index of the starting PRB of the first hop in a case that the terminal apparatus 1 performs frequency hopping. A higher layer parameter interlaceIndex 905 may be an index of the interlace used in a case that the terminal apparatus 1 transmits the PUCCH. In a case of 30 kHz SCS, MaxInterlaceMinus1 may be 4. In a case of 15 kHz SCS, MaxInterlaceMinus1 may be 9. A higher layer parameter subbandIndex 906 may be a parameter indicating a band used in a case that the terminal apparatus 1 transmits the PUCCH. Subbandindication may be one or multiple values out of $\{0, 1, 2, 3\}$, may be one or multiple values out of $\{1, 2, 3, 4\}$, or may be the PRB index of the starting PRB included in a band in which the terminal apparatus 1 transmits the PUCCH. In a case that the interlace is not configured for the terminal apparatus 1, the terminal apparatus 1 need not expect that the higher layer parameter interlaceIndex 905 and/or the higher layer parameter subbandIndex 906 is configured.

PRB index $a_{PRB}$ may be given based at least on a part or all of the number $N_{int}$ of interlaces, an index $x_1$ of the interlace, the smallest PRB index $y_1$ out of the PRB indexes of one or multiple PRBs included in the interlace used for PUCCH transmission, the smallest PRB index $y_2$ out of the PRBs constituting a band in which the PUCCH is transmitted, a parameter $y_3$ indicating a band in which the uplink channel (the PUCCH or the PUSCH) is transmitted, the number $z_1$ of PRBs included in the interlace used for PUCCH transmission, and the number $z_2$ of PRBs of the band in which the PUCCH is transmitted.

The terminal apparatus 1 may, for example, map the PUCCH to the PRB indicated by the PRB index determined by equation 1. Here, n may be $n=\{0, 1, \ldots, n_{max}-1\}$. $n_{max}$ may be the number of PRBs constituting one interlace. $n_{max}$ may be given by a higher layer parameter nrofPRBsPerInterlace. In a case of 30 kHz SCS, μ may be 1. In a case of 15 kHz SCS, μ may be 0. $y_1$ may be a value indicating the interlace and the band in which the uplink channel (the PUCCH or the PUSCH) is transmitted. $y_1$ may be a PRB index, or may be a CRB index. $y_1$ may be given by the higher layer parameter startingPRB.

$$a_{PRB} = n \cdot 10 \cdot 2^{-\mu} + y_1 \quad \text{[Math. 1]}$$

Figure 8:
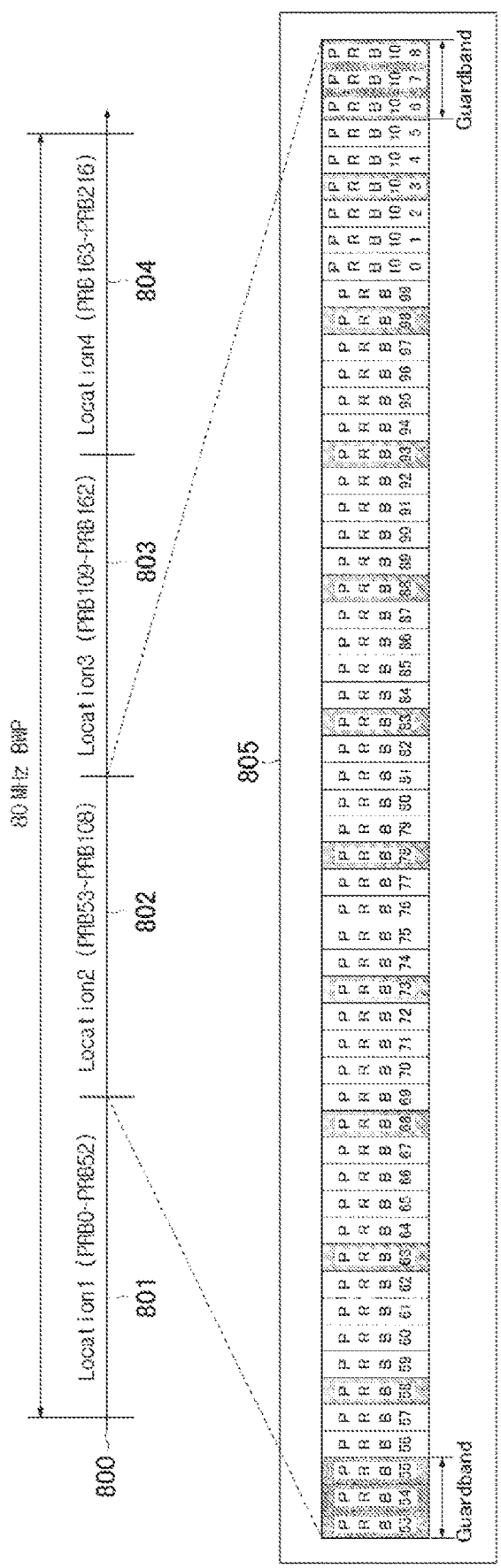
FIG. 8 is a diagram illustrating an example of a first method for mapping a PUCCH to the PRBs according to the present embodiment in the present embodiment.

FIG. 8 is a diagram illustrating an example of a first method for mapping the PUCCH to the PRBs according to the present embodiment. In FIG. 8, "PRB XXX" may mean that the PRB index is XXX. For example, "PRB 100" may mean that the PRB index is 100. In FIG. 8, a BWP 800 having a bandwidth of 80 MHz is configured for the terminal apparatus 1. The BWP 800 may include one or multiple PRB sets. The one or multiple PRB sets may be referred to as a Location (or a subband). The bandwidth corresponding to the Location may be referred to as an LBT bandwidth.

Description will be given to an example (example 1) in which the higher layer parameter illustrated in FIG. 9 is used in 30 kHz SCS. For example, in a case that the terminal apparatus 1 is given value 58 of $y_1$ by the higher layer parameter startingPRB and value 10 of $n_{max}$ by the higher layer parameter nrofPRBsPerInterlace, the terminal apparatus 1 may determine $n=\{0, 1, \ldots, 9\}$, which is the range of n, by using $n_{max}$, and substitute the value of $y_1$ and n into equation 1 to thereby determine the PRB indexes $a_{PRB}$ of the PRBs to which the PUCCH is mapped. In other words, the PRB indexes $a_{PRB}$ of the PRBs to which the PUCCH is mapped may be a PRB 58, a PRB 63, a PRB 68, a PRB 73, a PRB 78, a PRB 83, a PRB 88, a PRB 93, a PRB 98, and a PRB 103. In a case that the terminal apparatus 1 maps the uplink channel (the PUCCH or the PUSCH) to the PRBs, the terminal apparatus 1 may map the uplink channel in ascending order from the PRB having the smallest $a_{PRB}$. In a case that the terminal apparatus 1 maps the uplink channel (the PUCCH or the PUSCH) to the PRBs, the terminal apparatus 1 may map the uplink channel in descending order from the PRB having the largest $a_{PRB}$.

Description will be given to an example (example 2) in which the higher layer parameter illustrated in FIG. 9 is used in 30 kHz SCS. For example, in a case that the terminal apparatus 1 is given value 58 of $y_1$ by the higher layer parameter startingPRB 902, and the value of $n_{max}$ is 10, the terminal apparatus 1 may determine $n=\{0, 1, \ldots, 9\}$, which is the range of n, by using $n_{max}$, and substitute the value of $y_1$ and n into equation 1 to thereby determine the PRB indexes $a_{PRB}$ of the PRBs to which the PUCCH is mapped. In other words, the PRB indexes $a_{PRB}$ of the PRBs to which the PUCCH is mapped may be a PRB 58, a PRB 63, a PRB 68, a PRB 73, a PRB 78, a PRB 83, a PRB 88, a PRB 93, a PRB 98, and a PRB 103. In a case that the terminal apparatus 1 maps the uplink channel (the PUCCH or the PUSCH) to the PRBs, the terminal apparatus 1 may map the uplink channel in ascending order from the PRB having the smallest $a_{PRB}$. In a case that the terminal apparatus 1 maps the uplink channel (the PUCCH or the PUSCH) to the PRBs, the terminal apparatus 1 may map the uplink channel in descending order from the PRB having the largest $a_{PRB}$.

In example 1 and example 2, the terminal apparatus 1 may ignore the higher layer parameter intraSlotFrequencyHopping 903, the higher layer parameter secondHopPRB 904, the higher layer parameter interlaceIndex 905, and the higher layer parameter subbandIndex 906. In example 1 and example 2, the terminal apparatus 1 need not expect that the higher layer parameter intraSlotFrequencyHopping 903, the higher layer parameter secondHopPRB 904, the higher layer parameter interlaceIndex 905, and the higher layer parameter subbandIndex 906 are configured.

The terminal apparatus 1 may map the PUCCH to the PRBs indicated by the PRB indexes $a_{PRB}$ determined by equation 2, for example. Here, n may be determined by equation 3. n may be $n=\{0, 1, \ldots, z_2-1\}$. $z_1$ may be the number of PRBs constituting the band in which the uplink channel is transmitted. $z_1$ may be the number of contiguous PRBs not including a guard band that constitute the band in which the uplink channel is transmitted. $z_2$ may be the number of PRBs constituting one interlace used by the uplink channel for transmission. $z_2$ may be 10, or may be 11. In a case of 30 kHz SCS, μ may be 1. In a case of 15 kHz SCS, μ may be 0.

$$a_{PRB} = n \cdot 10 \cdot 2^{-\mu} + y_2 + p_o \quad \text{[Math. 2]}$$

$$n = \left\{0, 1, 2, \ldots, \text{floor}\left(\frac{z_1 - p_o - 1)}{N_{int}}\right)\right\} \quad \text{[Math. 3]}$$

$$p_o = (x_1 - y_2) \bmod N_{int} \quad \text{[Math. 4]}$$

$$p_o = (x_1 - y_2 - N_{BWP}^{start}) \bmod N_{int} \quad \text{[Math. 5]}$$

$y_2$ may be a PRB index, or may be a CRB index. $y_2$ may be a parameter indicating the band in which the uplink channel (the PUCCH or the PUSCH) is transmitted. $y_2$ may be given based on a higher layer parameter CRB-Starting-Index. $y_2$ may be given based on a higher layer parameter PRB-StartingIndex. $y_2$ may be the lowest PRB index out of the PRBs except the guard band that constitute the band in which the uplink channel is transmitted. For example, in FIG. 8, in a case that the base station apparatus 3 indicates transmission of the uplink channel in Location 2 of 802 for the terminal apparatus 1, the base station apparatus 3 may configure the value of the higher layer parameter PRB-StartingIndex to 56. For example, in FIG. 8, in a case that the terminal apparatus 1 receives 56 as the value of the higher layer parameter PRB-StartingIndex, the terminal apparatus 1 may transmit the uplink channel in Location 2 of 802 including the PRB having the PRB index of 56. $y_2$ may be the lowest PRB index out of the PRBs including the guard band that constitute the band in which the uplink channel is transmitted. For example, in FIG. 8, in a case that the base station apparatus 3 indicates transmission of the uplink channel in Location 2 of 802 for the terminal apparatus 1, the base station apparatus 3 may configure the value of the higher layer parameter PRB-StartingIndex to 53. For example, in FIG. 8, in a case that the terminal apparatus 1 receives 53 as the value of the higher layer parameter PRB-StartingIndex, the terminal apparatus 1 may transmit the uplink channel in Location 2 of 802 including the PRB having the PRB index of 56.

The band in which the uplink channel is transmitted may be a set of contiguous PRBs not including the guard band (guardband). For example, in FIG. 8, in a case that the terminal apparatus 1 transmits the PUCCH in Location 2, the band in which the uplink channel is transmitted may be a band from the PRB 56 to the PRB 105 except for the PRB 53, the PRB 54, the PRB 55, the PRB 106, the PRB 107, and the PRB 108 being the PRBs included in the guard band.

$N_{int}$ may be the number of interlaces configured for the terminal apparatus 1. In a case of 30 kHz SCS, $N_{int}$ may be 5. In a case of 15 kHz SCS, $N_{int}$ may be 10. $x_1$ may be the index of the interlace. $x_1$ may be given by a higher layer parameter interlacex1-r16. $x_1$ may be given by a higher layer parameter interlace-r16. In a case of 30 kHz SCS, $x_1$ may be any one or multiple values of (0, 1, 2, 3, 4). In a case of 15 kHz SCS, $x_1$ may be any one or multiple values of (0, 1, 2, 3, 4, 5, 6, 7, 8, 9).

In a case that the index of the interlace starts with a PRB 0, in other words, in a case that the index of the interlace is determined by ($n_{PRB}$ mod $N_{int}$), $p_o$ may be determined by equation 4. $p_o$ may be a difference between the smallest PRB index except the guard band out of one or multiple PRBs constituting the band for transmitting the PUCCH and the smallest PRB index out of one or multiple PRBs corresponding to the index of the interlace indicated by the higher layer parameter interlaceIndex used for PUCCH transmission. For example, in a case that the smallest PRB index except the guard band out of one or multiple PRBs constituting the band for transmitting the PUCCH is 6, and the smallest PRB index out of one or multiple PRBs corresponding to the index of the interlace indicated by the higher layer parameter interlaceIndex used for PUCCH transmission is 8, $p_o$ may be 2. In a case that the index of the interlace starts with a CRB 0, in other words, in a case that the index of the interlace is determined by (($n_{PRB}+N_{BWP}^{start}$) mod $N_{int}$), $p_o$ may be determined by equation 5. $p_o$ may be a positive integer including 0. For example, (−2 mod 5) is 5*(−1)+3=−2, and may thus be 3. In a case that the terminal apparatus 1 maps the uplink channel (the PUCCH or the PUSCH) to the PRBs, the terminal apparatus 1 may map the uplink channel in ascending order from the PRB having the smallest $a_{PRB}$. In a case that the terminal apparatus 1 maps the uplink channel (the PUCCH or the PUSCH) to the PRBs, the terminal apparatus 1 may map the uplink channel in descending order from the PRB having the largest $a_{PRB}$.

The index of the interlace may be associated with the PRB index ($n_{PRB}$). The index of the interlace may be associated with a common resource block (CRB) index. The CRB index may be the sum of the PRB index and $N_{BWP}^{start}$. Here, $N_{BWP}^{start}$ may be the number of PRBs from CRB index 0 to the starting PRB of the BWP. The number of PRBs may be the number excluding the starting PRB of the BWP. The index of the interlace may satisfy the relationship of ($n_{PRB}$ mod $N_{int}$). The index of the interlace may be (($n_{PRB}+N_{BWP}^{start}$) mod $N_{int}$).

Description will be given to an example (example 3) in which the higher layer parameter illustrated in FIG. 9 is used in 30 kHz SCS. For example, the value of $y_2$ may be given to the terminal apparatus 1, based on the higher layer parameter startingPRB 902 or the higher layer parameter subbandIndex 906. Here, in a case that the value of $y_2$ is given to the terminal apparatus 1, based on the higher layer parameter startingPRB 902, the higher layer parameter subbandIndex 906 need not be configured for the terminal apparatus 1. In a case that the value of $y_2$ is given to the terminal apparatus 1, based on the higher layer parameter subbandIndex 906, the higher layer parameter startingPRB 902 need not be configured for the terminal apparatus 1. $z_1$ may be given based on a higher layer parameter. $z_1$ may be given based on the value of 702 illustrated in FIG. 7. $x_1$ may be given based on the higher layer parameter interlaceIndex 905. For example, in a case that $x_1$=0, $y_2$=0, and $z_1$=51 are configured for the terminal apparatus 1 in 30 kHz SCS having a bandwidth of 20 MHz, and the index of the interlace is given based on the PRB index, the terminal apparatus 1 may determine the PRB indexes $a_{PRB}$ of the PRBs to which the PUCCH is mapped={0, 5, 10, 15, 20, 25, 30, 35, 40, 45, 50}, based on equation 2, equation 3, and equation 4. For example, in a case that $x_1$=0, $y_2$=0, $z_1$=51, and $N_{BWP}^{start}$=11 are configured for the terminal apparatus 1 in 30 kHz SCS having a bandwidth of 20 MHz, and the index of the interlace is given based on the CRB index, the terminal apparatus 1 may determine the PRB indexes $a_{PRB}$ of the PRBs to which the PUCCH is mapped={4, 9, 14, 19, 24, 29, 34, 39, 44, 49}, based on equation 2, equation 3, and equation 4.

Description will be given to an example (example 4) in which the higher layer parameter illustrated in FIG. 9 is used in 30 kHz SCS. For example, the value of $y_2$ may be given to the terminal apparatus 1, based on the higher layer parameter startingPRB 902 or the higher layer parameter subbandIndex 906. Here, in a case that the value of $y_2$ is given to the terminal apparatus 1, based on the higher layer parameter startingPRB 902, the higher layer parameter subbandIndex 906 need not be configured for the terminal apparatus 1. In a case that the value of $y_2$ is given to the terminal apparatus 1, based on the higher layer parameter subbandIndex 906, the higher layer parameter startingPRB 902 need not be configured for the terminal apparatus 1. $z_2$ may be given based on a higher layer parameter. $z_2$ may be given based on the value of 704 illustrated in FIG. 7. $x_1$ may be given based on the higher layer parameter interlaceIndex 905. For example, in a case that $x_1=1$, $y_2=0$, and $z_2=10$ are configured for the terminal apparatus 1 in 30 kHz SCS having a bandwidth of 20 MHz, and the index of the interlace is given based on the PRB index, the terminal apparatus 1 may determine the PRB indexes $a_{PRB}$ of the PRBs to which the PUCCH is mapped={1, 6, 11, 16, 21, 26, 31, 36, 41, 46}, based on equation 2 and equation 4. For example, in a case that $x_1=1$, $y_2=0$, $z_2=10$, and $N_{BWP}^{start}=12$ are configured for the terminal apparatus 1 in 30 kHz SCS having a bandwidth of 20 MHz, and the index of the interlace is given based on the CRB index, the terminal apparatus 1 may determine the PRB indexes $a_{PRB}$ of the PRBs to which the PUCCH is mapped={4, 9, 14, 19, 24, 29, 34, 39, 44, 49}, based on equation 2, equation 3, and equation 4.

The terminal apparatus 1 may map the PUCCH to the PRBs indicated by the PRB indexes $a_{PRB}$ determined by equation 6, for example. Here, n may be determined by equation 3, or may be n={0, 1, ..., $z_2-1$}.

$$a_{PRB}=(n+y_3)\cdot 10 \cdot 2^{-\mu}+x_1 \quad \text{[Math. 6]}$$

$y_3$ may be a parameter indicating the band in which the uplink channel (the PUCCH or the PUSCH) is transmitted. $y_3$ may be given based on the higher layer parameter subbandIndex. $y_3$ may be given based on the PRB index corresponding to $x_1$. For example, $y_3$ may be determined from floor($PRB_{x1}/N_{int}$). Here, $PRB_{x1}$ may be the PRB index corresponding to $x_1$. The PRB index corresponding to $x_1$ may mean the smallest PRB index out of one or multiple PRBs corresponding to $x_1$ in a certain band in which the PUCCH is transmitted. For example, in FIG. 8, in a case that the index of the interlace is given by (PRB index mod $N_{int}$), and $x_1$ is 3, the PRB index $PRB_{x1}$ corresponding to $x_1$ may be 58.

The guard band may be present between a first band and a second band, and may be frequency resources not used for transmission of the PUCCH. The bandwidth of the guard band may be an integer multiple of the PRB. The guard band may be a set of one or multiple PRBs.

Hereinafter, various aspects of the terminal apparatus 1 and the base station apparatus 3 according to the present embodiment will be described.

(1) A first aspect of the present embodiment is a terminal apparatus including: a receiving circuitry configured to receive a higher layer parameter related to a configuration of an interlace; a transmitting circuitry configured to transmit a physical uplink control channel (PUCCH) by using the interlace; and a processing circuitry configured to determine a physical resource block (PRB) index(es) of one or multiple PRBs to which the PUCCH is mapped, wherein the first number of PRBs included in the interlace is determined based at least on a first value and a second value, the first value is given based at least on the second number of PRBs constituting a band in which the PUCCH is transmitted, and the second value is given based on an index of the interlace and a smallest PRB index out of the PRB index of one or multiple PRBs constituting the band in which the PUCCH is transmitted.

(4) A second aspect of the present embodiment is a base station apparatus including: a transmitting circuitry configured to transmit a higher layer parameter related to a configuration of an interlace; a receiving circuitry configured to receive a physical uplink control channel (PUCCH) by using the interlace; and a processing circuitry configured to determine a physical resource block (PRB) index of one or multiple PRBs to which the PUCCH is mapped, wherein the first number of PRBs included in the interlace is determined based at least on a first value and a second value, the first value is given based at least on the second number of PRBs constituting a band in which the PUCCH is transmitted, and the second value is given based on an index of the interlace and a smallest PRB index out of the PRB index of one or multiple PRBs constituting the band in which the PUCCH is transmitted.

With this configuration, the terminal apparatus 1 and the base station apparatus 3 can efficiently perform uplink and/or downlink transmission and/or reception.

A program running on the base station apparatus 3 and the terminal apparatus 1 according to one aspect of the present invention may be a program (program that causes a computer to function) that controls a Central Processing Unit (CPU) and the like, such that the program realizes the functions of the above-described embodiment according to one aspect of the present invention. Also, the information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the aforementioned embodiment may be partially implemented by a computer. In such a case, a program for implementing such control functions may be recorded on a computer-readable recording medium to cause a computer system to read and execute the program recorded on this recording medium.

Note that it is assumed that the "computer system" mentioned here refers to a computer system built into the terminal apparatus 1 or the base station apparatus 3, and the computer system includes an OS and hardware components such as a peripheral device. Furthermore, a "computer-readable recording medium" refers to a portable medium such as a flexible disk, a magneto-optical disk, a ROM, a CD-ROM, and the like, and a storage device such as a hard disk built into the computer system.

Moreover, the "computer-readable recording medium" may include a medium that dynamically retains the program for a short period of time, such as a communication wire that is used to transmit the program over a network such as the Internet or over a communication line such as a telephone line, and a medium that retains the program for a certain period of time, such as a volatile memory within the computer system which functions as a server or a client in a case that the program is transmitted via the communication wire. Furthermore, the aforementioned program may be configured to implement part of the functions described above, and also may be configured to be capable of implementing the functions described above in combination with a program already recorded in the computer system.

Furthermore, the base station apparatus 3 according to the aforementioned embodiment may be achieved as an aggregation (apparatus group) including multiple apparatuses. Each of the apparatuses included in such an apparatus group may include each function, or some or all portions of each functional block of the base station apparatus 3 according to the aforementioned embodiment. As the apparatus group, it is only necessary to have a complete set of functions or functional blocks of the base station apparatus 3. Moreover, the terminal apparatus 1 according to the aforementioned embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all of the functions of a node higher than an eNodeB.

Also, some or all portions of each of the terminal apparatus 1 and the base station apparatus 3 according to the aforementioned embodiment may be implemented as an LSI which is a typical integrated circuit or may be implemented as a chip set. The functional blocks of each of the terminal apparatus 1 and the base station apparatus 3 may be individually implemented as a chip, or some or all of the functional blocks may be integrated into a chip. A circuit integration technique is not limited to the LSI, and may be implemented with a dedicated circuit or a general-purpose processor. Moreover, in a case that with advances in semiconductor technology, a circuit integration technology with which an LSI is replaced appears, it is also possible to use an integrated circuit based on the technology.

In addition, although the aforementioned embodiments have described the terminal apparatus as an example of a communication apparatus, the present invention is not limited to such a terminal apparatus, and is applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which elements described in the respective embodiments and having mutually the same effects, are substituted for one another is also included.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
reception circuitry configured to receive a higher layer parameter including multiple values of indexes of multiple interlaces assigned to the terminal apparatus;
processing circuitry configured to determine multiple first indexes of multiple physical resource blocks (PRBs) to which a physical uplink control channel (PUCCH) is mapped; and
transmitting circuitry configured to transmit the PUCCH in a bandwidth part (BWP), wherein
in a case that the PUCCH is transmitted using the multiple interlaces, the multiple first indexes are determined based on the multiple values of indexes of the multiple interlaces, a number of resource blocks (RBs) used for the multiple interlaces, a number of the multiple interlaces, and a number of the one or multiple PRBs from zero to a starting PRB of the BWP in a common resource block (CRB) index.

2. The terminal apparatus according to claim 1, wherein in a case that a subcarrier spacing is a first value, the number of the multiple interlaces is determined to be a number of first interlaces, and in a case that the subcarrier spacing is a second value, the number of the multiple interlaces is determined to be a number of second interlaces.

3. A base station apparatus comprising:
transmission circuitry configured to transmit a higher layer parameter including multiple values of indexes of multiple interlaces assigned to the terminal apparatus; and
receiving circuitry configured to receive a physical uplink control channel (PUCCH) in a bandwidth part (BWP) by using multiple first indexes of multiple physical resource blocks (PRBs) to which the PUCCH is mapped, wherein
in a case that the PUCCH is transmitted using the multiple interlaces, the multiple first indexes are determined based on the multiple values of indexes of the multiple interlaces, a number of resource blocks (RBs) used for the multiple interlaces, a number of the multiple interlaces, and a number of the multiple PRBs from zero to a starting PRB of the BWP in a common resource block (CRB) index.

4. The base station apparatus according to claim 3, wherein
in a case that a subcarrier spacing is a first value, the number of the multiple interlaces is determined to be a number of first interlaces, and in a case that the subcarrier spacing is a second value, the number of the multiple interlaces is determined to be a number of second interlaces.

5. A communication method used for a terminal apparatus, the communication method comprising:

receiving a higher layer parameter including multiple values of indexes of multiple interlaces assigned to the terminal apparatus;

determining multiple first indexes of multiple physical resource blocks (PRBs) to which a physical uplink control channel (PUCCH) is mapped; and transmitting the PUCCH in a bandwidth part (BWP), wherein in a case that the PUCCH is transmitted using the multiple interlaces, the multiple first indexes are determined based on the multiple values of indexes of the multiple interlaces, a number of resource blocks (RBs) used for the multiple interlaces, a number of the multiple interlaces, and a number of the multiple PRBs from zero to a starting PRB of the BWP in a common resource block (CRB) index.

* * * * *